United States Patent
Ozawa et al.

(10) Patent No.: US 11,211,087 B2
(45) Date of Patent: Dec. 28, 2021

(54) MAGNETIC TAPE HAVING CHARACTERIZED BACK COATING LAYER, MAGNETIC RECORDING MEDIUM AND MAGNETIC RECORDING AND REPRODUCING DEVICE

(71) Applicant: FUJIFILM Corporation, Tokyo (JP)

(72) Inventors: Eiki Ozawa, Minami-ashigara (JP); Takuto Kurokawa, Minami-ashigara (JP)

(73) Assignee: FUJIFILM Corporation, Tokyo (JP)

(*) Notice: Subject to any disclaimer, the term of this patent is extended or adjusted under 35 U.S.C. 154(b) by 19 days.

(21) Appl. No.: 16/368,044

(22) Filed: Mar. 28, 2019

(65) Prior Publication Data
US 2019/0304488 A1    Oct. 3, 2019

(30) Foreign Application Priority Data

Mar. 29, 2018  (JP) .............................. JP2018-064062
Mar. 22, 2019  (JP) .............................. JP2019-054751

(51) Int. Cl.
| | | |
|---|---|---|
| G11B 5/735 | (2006.01) | |
| G11B 5/008 | (2006.01) | |
| G11B 5/584 | (2006.01) | |
| G11B 5/712 | (2006.01) | |

(52) U.S. Cl.
CPC ........ *G11B 5/7358* (2019.05); *G11B 5/00813* (2013.01); *G11B 5/584* (2013.01); *G11B 5/712* (2013.01)

(58) Field of Classification Search
None
See application file for complete search history.

(56) References Cited

U.S. PATENT DOCUMENTS

| | | | | |
|---|---|---|---|---|
| 8,535,817 B2* | 9/2013 | Imaoka | ............... | G11B 5/70 428/844 |
| 10,347,279 B2* | 7/2019 | Ozawa | ............... | G11B 5/733 |
| 10,403,318 B2* | 9/2019 | Kurokawa | ............... | G11B 5/725 |
| 10,424,330 B2* | 9/2019 | Kasada | ............... | G11B 5/708 |
| 10,475,481 B2* | 11/2019 | Oyanagi | ............... | G11B 5/8412 |
| 10,679,657 B2* | 6/2020 | Kurokawa | ............... | G11B 5/127 |
| 10,854,229 B2* | 12/2020 | Ozawa | ............... | G11B 5/78 |
| 2011/0274947 A1* | 11/2011 | Ishiguro | ............... | G11B 5/7023 428/840.4 |
| 2019/0027181 A1* | 1/2019 | Ozawa | ............... | G11B 5/712 |
| 2020/0342906 A1 | 10/2020 | Kasada | | |

FOREIGN PATENT DOCUMENTS

| | | |
|---|---|---|
| JP | 09-227883 A | 9/1997 |
| JP | 3575190 B2 | 10/2004 |
| JP | 2006-002112 A | 1/2006 |
| JP | 2007-191692 A | 8/2007 |
| JP | 2011-032400 A | 2/2011 |

OTHER PUBLICATIONS

Notice of Allowance dated Aug. 10, 2021 in U.S. Appl. No. 16/856,853.
Office Action dated Apr. 22, 2021 in U.S. Appl. No. 16/856,853.

* cited by examiner

*Primary Examiner* — Kevin M Bernatz
(74) *Attorney, Agent, or Firm* — Sughrue Mion, PLLC

(57) ABSTRACT

The magnetic tape includes a non-magnetic support; a magnetic layer including a ferromagnetic powder and a binding agent on one surface of the non-magnetic support; and a back coating layer including a non-magnetic powder and a binding agent on the other surface of the non-magnetic support, in which a center line average surface roughness Ra measured regarding a surface of the back coating layer is equal to or smaller than 7.0 nm, and a difference between a spacing $S_{after}$ measured by optical interferometry regarding the surface of the back coating layer after methyl ethyl ketone cleaning and a spacing $S_{before}$ measured by optical interferometry regarding the surface of the back coating layer before methyl ethyl ketone cleaning is greater than 0 nm and equal to or smaller than 30.0 nm.

20 Claims, No Drawings

US 11,211,087 B2

MAGNETIC TAPE HAVING CHARACTERIZED BACK COATING LAYER, MAGNETIC RECORDING MEDIUM AND MAGNETIC RECORDING AND REPRODUCING DEVICE

CROSS-REFERENCE TO RELATED APPLICATIONS

This application claims priority under 35 U.S.C 119 to Japanese Patent Application No. 2018-064062 filed on Mar. 29, 2018 and Japanese Patent Application No. 2019-054751 filed on Mar. 22, 2019. Each of the above applications is hereby expressly incorporated by reference, in its entirety, into the present application.

BACKGROUND OF THE INVENTION

1. Field of the Invention

The present invention relates to a magnetic tape, a magnetic recording medium and a magnetic recording and reproducing device.

2. Description of the Related Art

Magnetic recording media are widely divided into metal thin film type magnetic recording media and coating type magnetic recording media. The metal thin film type magnetic recording medium is a magnetic recording medium including a magnetic layer of a metal thin film formed by vapor deposition. On the other hand, a coating type magnetic recording medium (for example, see JP1997-227883A (JP-H09-227883A)) is a magnetic recording medium including a magnetic layer including ferromagnetic powder together with a binding agent. The coating type magnetic recording medium is a useful magnetic recording medium as a data storage medium for storing a large content of information for a long period of time, because chemical durability is more excellent than that of the metal thin film type magnetic recording medium.

In addition, magnetic recording media are divided into tape-shaped magnetic recording media and disk-shaped magnetic recording media, and tape-shaped magnetic recording media, that is, magnetic tapes are mainly used for storage such as data back-up.

SUMMARY OF THE INVENTION

In recent years, a back coating layer is provided on a surface of a non-magnetic support of a magnetic tape on a side opposite to a surface provided with a magnetic layer (for example, see claim 2 of JP1997-227883A (JP-H09-227883A)).

In the magnetic tape including a back coating layer, transfer of ruggedness of a surface of the back coating layer to a magnetic layer (also referred to as "set-off") may cause performance deterioration (for example, see paragraph 0008 of JP1997-227883A (JP-H09-227883A)). An example of such performance deterioration is occurrence of drop-out (reading failure of signal). The occurrence of drop-out causes an increase in error rate, and accordingly, it is desired to prevent the occurrence of drop-out.

Therefore, it is thought that, in order to prevent the occurrence of drop-out, a surface smoothness of the back coating layer is increased, and thus, the set-off hardly occurs.

Meanwhile, the magnetic tape is accommodated in a magnetic tape cartridge in a state of being wound around a reel. The recording of information on the magnetic tape and the reproducing of the recorded information are normally performed by mounting the magnetic tape cartridge on a drive and causing the magnetic tape to run in the drive. In order to prevent the occurrence of errors during the recording and reproducing, it is desired to stabilize the running (improving running stability) of the magnetic tape in the drive.

However, in recent years, the magnetic tape used for data storage is used in a data center in which a temperature and humidity are managed. On the other hand, in the data center, power saving is necessary for reducing the cost. For realizing the power saving, the managing conditions of the temperature and humidity of the data center can be alleviated compared to the current state, or the managing may not be necessary. However, in a case where the managing conditions of the temperature and humidity are alleviated or the managing is not performed, the magnetic tape is assumed to be exposed to an environmental change caused by the weather change or the seasonal change.

In regards to this point, from the studies of the inventors, it was clear that, in a magnetic tape having an increased surface smoothness of a back coating layer, in a case where a temperature change (for example, temperature change of approximately 15° C. to 50° C.) occurs from a low temperature (for example, higher than 0° C. and equal to or lower than 15° C.) to a high temperature (for example, 30° C. to 50° C.) under high humidity (for example, in the environment of relative humidity of approximately 70% to 100%), a phenomenon of a deterioration in running stability occurs.

Therefore, an object of the invention an aspect of is to prevent a deterioration in running stability due to a temperature change from a low temperature to a high temperature under high humidity, in a magnetic tape having an increased surface smoothness of a back coating layer.

According to one aspect of the invention, there is provided a magnetic tape, comprising: a non-magnetic support; a magnetic layer including a ferromagnetic powder and a binding agent on one surface of the non-magnetic support; and a back coating layer including a non-magnetic powder and a binding agent on the other surface of the non-magnetic support, in which a center line average surface roughness Ra measured regarding a surface of the back coating layer (hereinafter, also referred to as a "back coating layer surface roughness Ra") is equal to or smaller than 7.0 nm, and a difference ($S_{after}-S_{before}$) between a spacing $S_{after}$ measured by optical interferometry regarding the surface of the back coating layer after methyl ethyl ketone cleaning and a spacing $S_{before}$ measured by optical interferometry regarding the surface of the back coating layer before methyl ethyl ketone cleaning (hereinafter, also referred to as a "spacing difference ($S_{after}-S_{before}$) before and after methyl ethyl ketone cleaning" or simply "difference ($S_{after}-S_{before}$)") is greater than 0 nm and equal to or smaller than 30.0 nm.

In one aspect, the difference ($S_{after}-S_{before}$) may be 2.0 nm to 3.0 nm.

In one aspect, the difference ($S_{after}-S_{before}$) may be 4.0 nm to 28.0 nm.

In one aspect, the magnetic tape may further comprise a non-magnetic layer including a non-magnetic powder and a binding agent between the non-magnetic support and the magnetic layer.

In one aspect, the center line average surface roughness Ra measured regarding the surface of the back coating layer may be 3.0 nm to 7.0 nm.

According to another aspect of the invention, there is provided a magnetic recording and reproducing device comprising: the magnetic tape; and a magnetic head.

According to one aspect of the invention, it is possible to provide a magnetic tape which includes a back coating layer having a high surface smoothness and in which a deterioration in running stability due to a temperature change from a low temperature to a high temperature under high humidity is prevented, and a magnetic recording and reproducing device including this magnetic tape.

DESCRIPTION OF THE PREFERRED EMBODIMENTS

Magnetic Tape

One aspect of the invention relates to a magnetic tape, including: a non-magnetic support; a magnetic layer including a ferromagnetic powder and a binding agent on one surface of the non-magnetic support; and a back coating layer including a non-magnetic powder and a binding agent on the other surface, in which a center line average surface roughness Ra measured regarding a surface of the back coating layer is equal to or smaller than 7.0 nm, and a difference ($S_{after}-S_{before}$) between a spacing $S_{after}$ measured by optical interferometry regarding the surface of the back coating layer after methyl ethyl ketone cleaning and a spacing $S_{before}$ measured by optical interferometry regarding the surface of the back coating layer before methyl ethyl ketone cleaning is greater than 0 nm and equal to or smaller than 30.0 nm.

In the invention and the specification, the "methyl ethyl ketone cleaning" means ultrasonic cleaning (ultrasonic output: 40 kHz) performed for 100 seconds by dipping a test piece having a length of 5 cm cut out from the magnetic tape into methyl ethyl ketone (200 g) at a liquid temperature of 20° C. to 25° C. A width of the magnetic tape and a width of the test piece cut out from the magnetic tape is normally ½ inches (0.0127 meters). Regarding a magnetic tape having a width other than the width of ½ inches (0.0127 meters), a test piece having a length of 5 cm may be cut out and subjected to methyl ethyl ketone cleaning. The measurement of the spacing after the methyl ethyl ketone cleaning described below is performed, after the test piece after the methyl ethyl ketone cleaning is left in an environment of a temperature of 23° C. and relative humidity of 50% for 24 hours.

In the invention and the specification, the "surface of the back coating layer" of the magnetic tape is identical to the surface of the magnetic tape on the back coating layer side.

In the invention and the specification, the spacing measured by optical interferometry regarding the surface of the back coating layer of the magnetic tape is a value measured by the following method.

In a state where the magnetic tape (specifically, the test piece. The same applies hereinafter) and a transparent plate-shaped member (for example, glass plate or the like) are overlapped onto each other so that the surface of the back coating layer of the magnetic tape faces the transparent plate-shaped member, a pressing member is pressed against the side of the magnetic tape opposite to the back coating layer side at pressure of $5.05\times10^4$ N/m (0.5 atm). In this state, the surface of the back coating layer of the magnetic tape is irradiated with light through the transparent plate-shaped member (irradiation region: 150,000 to 200,000 µm²), and a spacing (distance) between the surface of the back coating layer of the magnetic tape and the surface of the transparent plate-shaped member on the magnetic tape is acquired based on intensity (for example, contrast of interference fringe image) of interference light generated due to a difference in a light path between reflected light from the surface of the back coating layer of the magnetic tape and reflected light from the surface of the transparent plate-shaped member on the magnetic tape. The light emitted here is not particularly limited. In a case where the emitted light is light having an emission wavelength over a comparatively wide wavelength range as white light including light having a plurality of wavelengths, a member having a function of selectively cutting light having a specific wavelength or a wavelength other than wavelengths in a specific wavelength range, such as an interference filter, is disposed between the transparent plate-shaped member and a light receiving unit which receives reflected light, and light at some wavelengths or in some wavelength ranges of the reflected light is selectively incident to the light receiving unit. In a case where the light emitted is light (so-called monochromatic light) having a single luminescence peak, the member described above may not be used. The wavelength of light incident to the light receiving unit can be set to be 500 to 700 nm, for example. However, the wavelength of light incident to the light receiving unit is not limited to be in the range described above. In addition, the transparent plate-shaped member may be a member having transparency through which emitted light passes, to the extent that the magnetic tape is irradiated with light through this member and interference light is obtained.

The interference fringe image obtained by the measurement of the spacing described above is divided into 300,000 points, a spacing of each point (distance between the surface of the back coating layer of the magnetic tape and the surface of the transparent plate-shaped member on the magnetic tape side) is acquired, this spacing is shown with a histogram, and a mode of this histogram is set as the spacing. The difference ($S_{after}-S_{before}$) is a value obtained by subtracting a mode before the methyl ethyl ketone cleaning from a mode after the methyl ethyl ketone cleaning of the 300,000 points.

Two test pieces from the same magnetic tape are cut out, a value $S_{before}$ of the spacing is obtained without performing the methyl ethyl ketone cleaning with respect to the one test piece, and a value $S_{after}$ of the spacing is obtained after performing the methyl ethyl ketone cleaning with respect to the other test piece, and the difference ($S_{after}-S_{before}$) may be obtained. Alternatively, the difference ($S_{after}-S_{before}$) may be obtained by acquiring values of the spacing after performing the methyl ethyl ketone cleaning with respect to the test piece, with which the value of the spacing before the methyl ethyl ketone cleaning is acquired.

The above measurement can be performed by using a commercially available tape spacing analyzer (TSA) such as Tape Spacing Analyzer manufactured by Micro Physics, Inc., for example. The spacing measurement of the examples was performed by using Tape Spacing Analyzer manufactured by Micro Physics, Inc.

In the magnetic tape, the center line average surface roughness Ra measured regarding the surface of the back coating layer is equal to or smaller than 7.0 nm. That is, the magnetic tape is a magnetic tape including a back coating layer having a high surface smoothness. In such a magnetic tape, by setting the difference ($S_{after}\ S_{before}$) of the spacings before and after the methyl ethyl ketone cleaning to be greater than 0 nm and equal to or smaller than 30.0 nm, it is possible to prevent a deterioration in running stability due to a temperature change from a low temperature to a high temperature under high humidity. A surmise of the inventors regarding this point is as follows.

The recording of information on the magnetic tape and the reproducing of the recorded information are normally performed by mounting a magnetic tape cartridge on a drive and causing the magnetic tape to run in the drive. In general, the surface of the back coating layer comes into contact with a drive constituent element such as a roller performing sending and/or winding of the magnetic tape in the drive, during the running. Here, it is thought that, in a case where a contact state between the surface of the back coating layer and the drive constituent element is unstable, running stability of the magnetic tape in the drive is deteriorated. In regards to this point, in the magnetic tape having a high surface smoothness of the back coating layer, a coefficient of friction during the contact between the surface of the back coating layer and the drive constituent element is easily increased, and accordingly, the contact state tends to become unstable.

Meanwhile, it is thought that, in a case where temperature change from a low temperature to a high temperature occurs under high humidity, condensation (attachment of moisture) occurs on the surface of the back coating layer of the magnetic tape. It is surmised that the presence of moisture causes an increase in a coefficient of friction during the contact between the surface of the back coating layer and the drive constituent element. In the magnetic tape having a high surface smoothness of the back coating layer, the inventors have thought that, a tendency that the coefficient of friction during the contact between the surface of the back coating layer and the drive constituent element easily increases and the coefficient of friction further increases due to the presence of moisture, may be a reason for a deterioration in running stability, in a case where a temperature change from a low temperature to a high temperature occurs under high humidity, in the magnetic tape having a high smoothness of the surface of the back coating layer. Therefore, it is thought that, a decrease in amount of moisture attached to the surface of the back coating layer, in a case where a temperature change from a low temperature to a high temperature occurs under high humidity, allows the prevention of an increase in coefficient of friction.

However, a portion (projection) which mainly comes into contact (so-called real contact) with the drive constituent element during the contact between the surface of the back coating layer and the drive constituent element, and a portion (hereinafter, referred to as a "base portion") having a height lower than that of the portion described above are normally present on the surface of the back coating layer. The inventors have thought that the spacing described above is a value which is an index for a distance between the drive constituent element and the base portion during the contact between the surface of the back coating layer and the drive constituent element. However, it is thought that, in a case where some components are present on the surface of the back coating layer, as the amount of the components interposed between the base portion and the drive constituent element increases, the spacing is narrowed. Meanwhile, in a case where the components are removed by the methyl ethyl ketone cleaning, the spacing spreads, and accordingly, the value of the spacing $S_{after}$ after the methyl ethyl ketone cleaning is greater than the value of the spacing $S_{before}$ before the methyl ethyl ketone cleaning. Accordingly, it is thought that the difference $(S_{after}-S_{before})$ of the spacings before and after the methyl ethyl ketone cleaning can be an index for the amount of the component interposed between the base portion and the drive constituent element.

In regards to this point, the inventors have thought that the presence of the component removed by the methyl ethyl ketone cleaning on the surface of the back coating layer promotes the attachment of moisture to the surface of the back coating layer, in a case where a temperature change from a low temperature to a high temperature occurs under high humidity. Accordingly, the inventors have surmised that, in a case where the difference $(S_{after}-S_{before})$ of the spacings before and after the methyl ethyl ketone cleaning is decreased, that is, a decrease in the amount of the component contributes to prevention of the attachment of moisture, and as a result, this allows the prevention of an increase in coefficient of friction. Therefore, the inventors have thought that, in the magnetic tape having a high smoothness of the surface of the back coating layer, it is possible to prevent a deterioration in running stability due to a temperature change from a low temperature to a high temperature under high humidity. With respect to this, according to the studies of the inventors, a correlation is not found between the value of the difference of spacings before and after cleaning using a solvent other than methyl ethyl ketone, for example, n-hexane, and a deterioration in running stability of the magnetic tape having an increased smoothness of the surface of the back coating layer due to a temperature change from a low temperature to a high temperature under high humidity. It is surmised that this is because the component cannot be removed or cannot be sufficiently removed in the n-hexane cleaning.

Details of the component are not clear. Merely as a surmise, the inventors thought that the component may be a component, a molecular weight of which is greater than that of an organic compound normally added to the back coating layer as an additive. The inventors have surmised as follows regarding one aspect of this component. In one aspect, the back coating layer is formed by applying a back coating layer forming composition including a curing agent onto a non-magnetic support, in addition to the non-magnetic powder and the binding agent, and performing a curing treatment. With the curing treatment here, it is possible to allow a curing reaction (crosslinking reaction) between the binding agent and the curing agent. However, it is thought that the binding agent which is not subjected to the curing reaction with the curing agent or the binding agent which is insufficiently subjected to the curing reaction with the curing agent is easily separated from the back coating layer and may be present on the surface of the back coating layer. The inventors have surmised that the moisture easily adsorbed to the binding agent (for example, functional group including this binding agent) is a reason of the promotion of the attachment of moisture to the surface of the back coating layer, in a case where a temperature change from a low temperature to a high temperature occurs under high humidity.

However, the above description is merely a surmise of the inventors and the invention is not limited thereto.

Hereinafter, the magnetic tape will be further described in detail.

Back Coating Layer Surface Roughness Ra

The center line average surface roughness Ra measured regarding the surface of the back coating layer of the magnetic tape (back coating layer surface roughness Ra) is equal to or smaller than 7.0 nm. The back coating layer surface roughness Ra equal to or smaller than 7.0 nm can contribute to the prevention of occurrence of drop-out in the magnetic tape. The back coating layer surface roughness Ra is preferably equal to or smaller than 6.0 nm and more preferably equal to or smaller than 5.0, from a viewpoint of further preventing the occurrence of drop-out. However, in the magnetic tape having a back coating layer having a high surface smoothness, the running stability is deteriorated due to a temperature change from a low temperature to a high temperature under high humidity, in a case where there is no countermeasure. With respect to this, in the magnetic tape in which the spacing difference ($S_{after}$–$S_{before}$) before and after methyl ethyl ketone cleaning is in the range described above, it is possible to prevent the deterioration in running stability due to a temperature change from a low temperature to a high temperature under high humidity, even in a case where a back coating layer having a high surface smoothness is included. The back coating layer surface roughness Ra is preferably equal to or greater than 1.0 nm, more preferably equal to or greater than 2.0 nm, even more preferably equal to or greater than 3.0 nm, and still preferably equal to or greater than 4.0 nm, from a viewpoint of further stabilize the contact state between the surface of the back coating layer and the drive constituent element. Meanwhile, from a viewpoint of further reducing the drop-out, a low back coating layer surface roughness Ra is preferable, and accordingly, a value smaller than the exemplified lower limit may be preferable.

The center line average surface roughness Ra measured regarding the surface of the back coating layer in the invention and the specification is a value measured with an atomic force microscope (AFM) in a region having an area of 40 μm×40 μm of the surface of the back coating layer. As an example of the measurement conditions, the following measurement conditions can be used. The back coating layer surface roughness Ra shown in examples which will be described later is a value obtained by the measurement under the following measurement conditions.

The measurement is performed regarding the region of 40 μm×40 μm of the area of the surface of the back coating layer of the magnetic tape with an AFM (Nanoscope 4 manufactured by Veeco Instruments, Inc.) in a tapping mode. RTESP-300 manufactured by BRUKER is used as a probe, a scan speed (probe movement speed) is set as 40 μm/sec, and a resolution is set as 512 pixel×512 pixel.

The back coating layer surface roughness Ra can be controlled by a well-known method. For example, the back coating layer surface roughness Ra can be changed in accordance with the size of various powders included in the back coating layer (for example, inorganic powder and carbon black), the content, or manufacturing conditions of the magnetic tape. Thus, by adjusting these, it is possible to obtain the magnetic tape having the back coating layer surface roughness Ra equal to or smaller than 7.0 nm.

Spacing Difference ($S_{after}$–$S_{before}$) Before and after Methyl Ethyl Ketone Cleaning The spacing difference ($S_{after}$– $S_{before}$) before and after methyl ethyl ketone cleaning measured by optical interferometry regarding the surface of the back coating layer of the magnetic tape is greater than 0 nm and equal to or smaller than 30.0 nm. By setting the difference ($S_{after}$–$S_{before}$) to be equal to or smaller than 30.0 nm, it is possible to prevent a deterioration in running stability due to a temperature change from a low temperature to a high temperature under high humidity, in the magnetic tape having a high smoothness of the surface of the back coating layer. From this viewpoint, the difference ($S_{after}$ $S_{before}$) is equal to or smaller than 30.0 nm, preferably equal to or smaller than 29.0 nm, more preferably equal to or smaller than 28.0 nm, even more preferably equal to or smaller than 27.0 nm, still preferably equal to or smaller than 26.0 nm, and still more preferably equal to or smaller than 25.0 nm. As will be described later in detail, the difference ($S_{after}$ $S_{before}$) can be controlled by a surface treatment of the back coating layer in a manufacturing step of the magnetic tape. However, as a result of studies of the inventors, it was determined that, as the spacing difference ($S_{after}$–$S_{before}$) before and after the methyl ethyl ketone cleaning becomes 0 nm, in a case where the surface treatment of the back coating layer is performed, it is difficult to prevent a deterioration in running stability due to a temperature change from a low temperature to a high temperature under high humidity, in the magnetic tape having a high smoothness of the surface of the back coating layer. The reason is not clear. Merely as a surmise, the inventors thought that, as the spacing difference ($S_{after}$–$S_{before}$) before and after the methyl ethyl ketone cleaning becomes 0 nm, in a case where the surface treatment of the back coating layer is performed, the component (for example, lubricant) contributing to the improvement of running stability is excessively removed from the magnetic tape. From this viewpoint, the spacing difference ($S_{after}$–$S_{before}$) of the magnetic tape before and after the methyl ethyl ketone cleaning is greater than 0 nm, preferably equal to or greater than 1.0 nm, more preferably equal to or greater than 2.0 nm, even more preferably equal to or greater than 3.0 nm, still preferably equal to or greater than 4.0 nm.

Next, the magnetic layer, the back coating layer, and the non-magnetic support of the magnetic tape, and the non-magnetic layer, which is randomly included will be further described.

Magnetic Layer

Ferromagnetic Powder As the ferromagnetic powder included in the magnetic layer, ferromagnetic powder known as ferromagnetic powder used in the magnetic layer of various magnetic recording media can be used. It is preferable to use ferromagnetic powder having a small average particle size, from a viewpoint of improvement of recording density. From this viewpoint, an average particle size of the ferromagnetic powder is preferably equal to or smaller than 50 nm, more preferably equal to or smaller than 45 nm, even more preferably equal to or smaller than 40 nm, still preferably equal to or smaller than 35 nm, still preferably equal to or smaller than 30 nm, still more preferably equal to or smaller than 25 nm, and still even more preferably equal to or smaller than 20 nm. Meanwhile, the average particle size of the ferromagnetic powder is preferably equal to or greater than 5 nm, more preferably equal to or greater than 8 nm, even more preferably equal to or greater than 10 nm, still preferably equal to or greater than 15 nm, and still more preferably equal to or greater than 20 nm, from a viewpoint of stability of magnetization.

Hexagonal Ferrite Powder

As a preferred specific example of the ferromagnetic powder, hexagonal ferrite powder can be used. For details of the hexagonal ferrite powder, descriptions disclosed in paragraphs 0012 to 0030 of JP2011-225417A, paragraphs 0134 to 0136 of JP2011-216149A, paragraphs 0013 to 0030 of JP2012-204726A, and paragraphs 0029 to 0084 of JP2015-127985A can be referred to, for example.

In the invention and the specification, the "hexagonal ferrite powder" is to be understood to mean ferromagnetic powder from which a hexagonal ferrite type crystal structure can be detected as a main phase by X-ray diffraction analysis. The main phase is to be understood to mean a structure to which the diffraction peak with the highest intensity in an X-ray diffraction spectrum obtained by X-ray diffraction analysis is assigned. For example, when the diffraction peak with the highest intensity in an X-ray diffraction spectrum obtained by X-ray diffraction analysis is assigned to the hexagonal ferrite type crystal structure, it shall be determined that the hexagonal ferrite type crystal structure is detected as a main phase. When a single structure is only detected by X-ray diffraction analysis, this detected structure is determined as a main phase. The hexagonal ferrite type crystal structure at least contains, as constitutional atoms, an iron atom, a divalent metal atom, and an oxygen atom. A divalent metal atom is a metal atom which can convert into a divalent cation as an ion thereof, and examples thereof include alkaline earth metal atoms, such as a strontium atom, a barium atom, and a calcium atom, and a lead atom. In the invention and the specification, the hexagonal strontium ferrite powder is to be understood to mean powder in which a main divalent metal atom contained therein is a strontium atom, and the hexagonal barium ferrite powder is to be understood to mean powder in which a main divalent metal atom contained therein is a barium atom. The main divalent metal atom is to be understood to mean a divalent metal atom having the highest content in terms of atom % among divalent metal atoms contained in this powder. However, the divalent metal atom does not include rare earth atoms. In the invention and the specification, the rare earth atoms are selected from the group consisting of a scandium atom (Sc), an yttrium atom (Y), and a lanthanoid atom. The lanthanoid atom is selected from the group consisting of a lanthanum atom (La), a cerium atom (Ce), a praseodymium atom (Pr), a neodymium atom (Nd), a promethium atom (Pm), a samarium atom (Sm), an europium atom (Eu), a gadolinium atom (Gd), a terbium atom (Tb), a dysprosium atom (Dy), a holmium atom (Ho), an erbium atom (Er), a thulium atom (Tm), an ytterbium atom (Yb), and a lutetium atom (Lu).

Hereinafter, the hexagonal strontium ferrite powder which is one aspect of the hexagonal ferrite powder will be described in more detail.

The activation volume of the hexagonal strontium ferrite powder is preferably 800 to 1,600 nm$^3$. The atomized hexagonal strontium ferrite powder showing the activation volume in the range described above is suitable for manufacturing a magnetic tape exhibiting excellent electromagnetic conversion characteristics. The activation volume of the hexagonal strontium ferrite powder is preferably equal to or greater than 800 nm$^3$ and can also be, for example equal to or greater than 850 nm$^3$. In addition, from a viewpoint of further improving electromagnetic conversion characteristics, the activation volume of the hexagonal strontium ferrite powder is more preferably equal to or smaller than 1,500 nm$^3$, even more preferably equal to or smaller than 1,400 nm$^3$, still preferably equal to or smaller than 1,300 nm$^3$, still more preferably equal to or smaller than 1,200 nm$^3$, and still even more preferably equal to or smaller than 1,100 nm$^3$. The same can be applied to the activation volume of the hexagonal barium ferrite powder.

The "activation volume" is a unit of magnetization reversal and an index showing a magnetic magnitude of the particles. Regarding the activation volume and an anisotropy constant Ku which will be described later disclosed in the invention and the specification, magnetic field sweep rates of a coercivity Hc measurement part at time points of 3 minutes and 30 minutes are measured by using a vibrating sample magnetometer (measurement temperature: 23° C.±1° C.), and the activation volume and the anisotropy constant Ku are values acquired from the following relational expression of Hc and an activation volume V. A unit of the anisotropy constant Ku is 1 erg/cc=1.0×10$^{-1}$ J/m$^3$.

$$Hc=2Ku/Ms\{1-[(kT/KuV)\ln(At/0.693)]^{1/2}\}$$

[In the expression, Ku: anisotropy constant (unit: J/m$^3$), Ms: saturation magnetization (unit: kA/m), k: Boltzmann's constant, T: absolute temperature (unit: K), V: activation volume (unit: cm$^3$), A: spin precession frequency (unit: s$^{-1}$), and t: magnetic field reversal time (unit: s)]

The anisotropy constant Ku can be used as an index of reduction of thermal fluctuation, that is, improvement of thermal stability. The hexagonal strontium ferrite powder can preferably have Ku equal to or greater than 1.8×10$^5$ J/m$^3$, and more preferably have Ku equal to or greater than 2.0×10$^5$ J/m$^3$. In addition, Ku of the hexagonal strontium ferrite powder can be, for example, equal to or smaller than 2.5×10$^5$ J/m$^3$. However, the high Ku is preferable, because it means high thermal stability, and thus, Ku is not limited to the exemplified value.

The hexagonal strontium ferrite powder may or may not include rare earth atom. In a case where the hexagonal strontium ferrite powder includes rare earth atom, it preferably includes rare earth atom in a content (bulk content) of 0.5 to 5.0 atom %, with respect to 100 atom % of iron atom is 0.5 to 5.0 atom %. In one aspect, the hexagonal strontium ferrite powder which includes rare earth atom can have a rare earth atom surface portion uneven distribution. The "rare earth atom surface portion uneven distribution" of the invention and the specification means that a rare earth atom content with respect to 100 atom % of iron atom in a solution obtained by partially dissolving the hexagonal strontium ferrite powder with acid (referred to as a "rare earth atom surface portion content" or simply as a "surface portion content" for rare earth atom) and a rare earth atom content with respect to 100 atom % of iron atom in a solution obtained by totally dissolving the hexagonal strontium ferrite powder with acid (referred to as a "rare earth atom bulk content" or simply as a "bulk content" for rare earth atom) satisfy a ratio of "rare earth atom surface portion content/rare earth atom bulk content >1.0". The rare earth atom content of the hexagonal strontium ferrite powder is identical to the bulk content. With respect to this, the partial dissolving using acid is to dissolve the surface portion of particles configuring the hexagonal strontium ferrite powder, and accordingly, the rare earth atom content in the solution obtained by the partial dissolving is the rare earth atom content in the surface portion of the particles configuring the hexagonal strontium ferrite powder. The rare earth atom surface portion content satisfying a ratio of "rare earth atom surface portion content/rare earth atom bulk content >1.0" means that the rare earth atoms are unevenly distributed in the surface portion (that is, a larger amount of the rare earth atom is present, compared to that inside), in the particles configuring the hexagonal strontium ferrite powder. The surface portion of the specification and the specification means a part of the region of the particles configuring the hexagonal strontium ferrite powder from the inside from the surface.

In a case where the hexagonal strontium ferrite powder includes rare earth atom, the hexagonal strontium ferrite powder preferably includes rare earth atom having a content (bulk content) of 0.5 to 5.0 atom % with respect to 100 atom % of an iron atom. It is surmised that the rare earth atom having the bulk content in the range described above and uneven distribution of the rare earth atom in the surface portion of the particles configuring the hexagonal strontium ferrite powder contribute to prevention of a decrease in reproducing output during repeated reproducing. This is surmised because the anisotropy constant Ku can be increased due to the rare earth atom having the bulk content in the range described above included in the hexagonal strontium ferrite powder and the uneven distribution of the rare earth atom in the surface portion of the particles configuring the hexagonal strontium ferrite powder. As the value of the anisotropy constant Ku is high, occurrence of a phenomenon which is so-called thermal fluctuation can be prevented (that is, thermal stability can be improved). By preventing occurrence of thermal fluctuation, a decrease in reproducing output during repeated reproducing can be prevented. This is surmised that, the uneven distribution of the rare earth atom in the surface portion of the particles of the hexagonal strontium ferrite powder may contribute to stabilization of a spin at an iron (Fe) site in a crystal lattice of the surface portion, thereby increasing the anisotropy constant Ku.

In addition, it is also surmised that, by using the hexagonal strontium ferrite powder having a rare earth atom surface portion uneven distribution as ferromagnetic powder of the magnetic layer, chipping of the surface of the magnetic layer due to sliding with a magnetic head can be prevented. That is, it is surmised that the hexagonal strontium ferrite powder having a rare earth atom surface portion uneven distribution also contributes to improvement of running durability of a magnetic tape. It is surmised that, this is because the uneven distribution of the rare earth atom in the surface of the particles configuring the hexagonal strontium ferrite powder contributes to an interaction between the surface of the particles and an organic substance (for example, binding agent and/or additive) included in the magnetic layer, thereby improving hardness of the magnetic layer.

From a viewpoint of further preventing a decrease in reproducing output during repeated running and/or a viewpoint of further improving running durability, the rare earth atom content (bulk content) is preferably 0.5 to 4.5 atom %, more preferably 1.0 to 4.5 atom %, and even more preferably 1.5 to 4.5 atom %.

The bulk content is a content obtained by totally dissolving the hexagonal strontium ferrite powder. In the invention and the specification, the content of the atom is a bulk content obtained by totally dissolving the hexagonal strontium ferrite powder, unless otherwise noted. The hexagonal strontium ferrite powder which includes rare earth atom may include only one kind of rare earth atom or may include two or more kinds of rare earth atom, as the rare earth atom. In a case where two or more kinds of rare earth atom are included, the bulk content is obtained from the total of the two or more kinds of rare earth atom. The same also applies to the other components of the invention and the specification. That is, for a given component, only one kind may be used or two or more kinds may be used, unless otherwise noted. In a case where two or more kinds are used, the content is a content of the total of the two or more kinds.

In a case where the hexagonal strontium ferrite powder includes rare earth atom, the rare earth atom included therein may be any one or more kinds of the rare earth atom. Examples of the rare earth atom preferable from a viewpoint of further preventing a decrease in reproducing output during repeated reproducing include a neodymium atom, a samarium atom, an yttrium atom, and a dysprosium atom, a neodymium atom, a samarium atom, an yttrium atom are more preferable, and a neodymium atom is even more preferable.

In the hexagonal strontium ferrite powder having a rare earth atom surface portion uneven distribution, a degree of uneven distribution of the rare earth atom is not limited, as long as the rare earth atom is unevenly distributed in the surface portion of the particles configuring the hexagonal strontium ferrite powder. For example, regarding the hexagonal strontium ferrite powder, a ratio of the surface portion content of the rare earth atom obtained by partial dissolving performed under the dissolving conditions exemplified below and the bulk content of the rare earth atom obtained by total dissolving performed under the dissolving conditions exemplified below, "surface portion content/bulk content" is greater than 1.0 and can be equal to or greater than 1.5. The surface portion content satisfying a ratio of "surface portion content/bulk content >1.0" means that the rare earth atoms are unevenly distributed in the surface portion (that is, a larger amount of the rare earth atoms is present, compared to that inside), in the particles configuring the hexagonal strontium ferrite powder. In addition, the ratio of the surface portion content of the rare earth atom obtained by partial dissolving performed under the dissolving conditions exemplified below and the bulk content of the rare earth atom obtained by total dissolving performed under the dissolving conditions exemplified below, "surface portion content/bulk content" can be, for example, equal to or smaller than 10.0, equal to or smaller than 9.0, equal to or smaller than 8.0, equal to or smaller than 7.0, equal to or smaller than 6.0, equal to or smaller than 5.0, or equal to or smaller than 4.0. However, the "surface portion content/bulk content" is not limited to the exemplified upper limit or the lower limit, as long as the rare earth atom is unevenly distributed in the surface portion of the particles configuring the hexagonal strontium ferrite powder.

The partial dissolving and the total dissolving of the hexagonal strontium ferrite powder will be described below. Regarding the hexagonal strontium ferrite powder present as the powder, sample powder for the partial dissolving and the total dissolving are collected from powder of the same batch. Meanwhile, regarding the hexagonal strontium ferrite powder included in a magnetic layer of a magnetic tape, a part of the hexagonal strontium ferrite powder extracted from the magnetic layer is subjected to the partial dissolving and the other part is subjected to the total dissolving. The extraction of the hexagonal strontium ferrite powder from the magnetic layer can be performed by a method disclosed in a paragraph 0032 of JP2015-91747A.

The partial dissolving means dissolving performed so that the hexagonal strontium ferrite powder remaining in the solution can be visually confirmed at the time of the completion of the dissolving. For example, by performing the partial dissolving, a region of the particles configuring the hexagonal strontium ferrite powder which is 10% to 20% by mass with respect to 100% by mass of a total of the particles can be dissolved. On the other hand, the total dissolving means dissolving performed until the hexagonal strontium ferrite powder remaining in the solution is not visually confirmed at the time of the completion of the dissolving.

The partial dissolving and the measurement of the surface portion content are, for example, performed by the following method. However, dissolving conditions such as the amount of sample powder and the like described below are merely examples, and dissolving conditions capable of performing the partial dissolving and the total dissolving can be randomly used.

A vessel (for example, beaker) containing 12 mg of sample powder and 10 ml of hydrochloric acid having a concentration of 1 mol/L is held on a hot plate at a set temperature of 70° C. for 1 hour. The obtained solution is filtered with a membrane filter having a hole diameter of 0.1 μm. The element analysis of the solution obtained as described above is performed by an inductively coupled plasma (ICP) analysis device. By doing so, the surface portion content of the rare earth atom with respect to 100 atom % of the iron atom can be obtained. In a case where a plurality of kinds of rare earth atoms are detected from the element analysis, a total content of the entirety of the rare earth atoms is the surface portion content. The same applies to the measurement of the bulk content.

Meanwhile, the total dissolving and the measurement of the bulk content are, for example, performed by the following method.

A vessel (for example, beaker) containing 12 mg of sample powder and 10 ml of hydrochloric acid having a concentration of 4 mol/L is held on a hot plate at a set temperature of 80° C. for 3 hours. After that, the process is performed in the same manner as in the partial dissolving and the measurement of the surface portion content, and the bulk content with respect to 100 atom % of the iron atom can be obtained.

From a viewpoint of increasing reproducing output in a case of reproducing information recorded on a magnetic tape, it is desirable that the mass magnetization as of ferromagnetic powder included in the magnetic tape is high. In regards to this point, in hexagonal strontium ferrite powder which includes the rare earth atom but does not have the rare earth atom surface portion uneven distribution, as tends to significantly decrease, compared to that in hexagonal strontium ferrite powder not including the rare earth atom. With respect to this, it is surmised that, hexagonal strontium ferrite powder having the rare earth atom surface portion uneven distribution is preferable for preventing such a significant decrease in as. In one aspect, as of the hexagonal strontium ferrite powder can be equal to or greater than 45 A·m²/kg and can also be equal to or greater than 47 A·m²/kg. On the other hand, from a viewpoint of noise reduction, as is preferably equal to or smaller than 80 A·m²/kg and more preferably equal to or smaller than 60 A·m²/kg. σs can be measured by using a known measurement device capable of measuring magnetic properties such as a vibrating sample magnetometer. Unless stated otherwise, the mass magnetization us is a value measured at a magnetic field strength of 15 kOe. With regard to the unit of as, 1 [kOe]=$10^6/4\pi$[A/m]

With regard to the contents (bulk contents) of the constituting atoms of the hexagonal strontium ferrite powder, the content of the strontium atom in the hexagonal strontium ferrite powder can be, for example, 2.0 to 15.0 atom % with respect to 100 atom % of the iron atom. In one aspect, in the hexagonal strontium ferrite powder, the divalent metal atom included in this powder can be only a strontium atom. In another aspect, the hexagonal strontium ferrite powder can also include one or more kinds of other divalent metal atoms, in addition to the strontium atom. For example, a barium atom and/or a calcium atom can be included. In a case where the divalent metal atom other than the strontium atom is included, a content of a barium atom and a content of a calcium atom in the hexagonal strontium ferrite powder respectively can be, for example, 0.05 to 5.0 atom % with respect to 100 atom % of the iron atom.

As the crystal structure of the hexagonal ferrite, a magnetoplumbite type (also referred to as an "M type"), a W type, a Y type, and a Z type are known. The hexagonal strontium ferrite powder may have any crystal structure. The crystal structure can be confirmed by X-ray diffraction analysis. In the hexagonal strontium ferrite powder, a single crystal structure or two or more kinds of crystal structure can be detected by the X-ray diffraction analysis. For example, in one aspect, in the hexagonal strontium ferrite powder, only the M type crystal structure can be detected by the X-ray diffraction analysis. For example, the M type hexagonal ferrite is represented by a compositional formula of $AFe_{12}O_{19}$. Here, A represents a divalent metal atom, in a case where the hexagonal strontium ferrite powder has the M type, A is only a strontium atom (Sr), or in a case where a plurality of divalent metal atoms are included as A, the strontium atom (Sr) occupies the hexagonal strontium ferrite powder with the greatest content based on atom % as described above. A content of the divalent metal atom in the hexagonal strontium ferrite powder is generally determined according to the type of the crystal structure of the hexagonal ferrite and is not particularly limited. The same applies to a content of an iron atom and a content of an oxygen atom. The hexagonal strontium ferrite powder at least includes an iron atom, a strontium atom, an oxygen atom, may include a rare earth atom, and may or may not include atoms other than these atoms. As an example, the hexagonal strontium ferrite powder may include an aluminum atom (Al). A content of the aluminum atom can be, for example, 0.5 to 10.0 atom % with respect to 100 atom % of the iron atom. From a viewpoint of further preventing a decrease in reproducing output during repeated reproducing, the hexagonal strontium ferrite powder includes the iron atom, the strontium atom, the oxygen atom, and the rare earth atom, and a content of the atoms other than these atoms is preferably equal to or smaller than 10.0 atom %, more preferably 0 to 5.0 atom %, and may be 0 atom % with respect to 100 atom % of the iron atom. That is, in one aspect, the hexagonal strontium ferrite powder may not include atoms other than the iron atom, the strontium atom, the oxygen atom, and the rare earth atom. The content shown with atom % described above is obtained by converting the content (unit: % by mass) of each atom obtained by totally dissolving the hexagonal strontium ferrite powder by using the atomic weight. In addition, in the invention and the specification, a given atom which is "not included" means that the content thereof obtained by performing total dissolving and measurement by using an ICP analysis device is 0% by mass. A detection limit of the ICP analysis device is generally equal to or smaller than 0.01 ppm (parts per million) based on mass. The expression "not included" is used as a meaning including that a given atom is included with the amount smaller than the detection limit of the ICP analysis device. In one aspect, the hexagonal strontium ferrite powder does not include a bismuth atom (Bi).

Metal Powder

As a preferred specific example of the ferromagnetic powder, ferromagnetic metal powder can also be used. For details of the ferromagnetic metal powder, descriptions disclosed in paragraphs 0137 to 0141 of JP2011-216149A and paragraphs 0009 to 0023 of JP2005-251351A can be referred to, for example.

ε-Iron Oxide Powder

As a preferred specific example of the ferromagnetic powder, ε-iron oxide powder can also be used. In the invention and the specification, the "ε-iron oxide powder" is to be understood to mean ferromagnetic powder from which an ε-iron oxide type crystal structure can be detected as a main phase by X-ray diffraction analysis. For example, when the diffraction peak with the highest intensity in an X-ray diffraction spectrum obtained by X-ray diffraction analysis is assigned to the ε-iron oxide type crystal structure, it shall be determined that the ε-iron oxide type crystal structure is detected as a main phase. As a method for producing ε-iron oxide powder, a method for producing ε-iron oxide powder from goethite and a reverse micelle method has been known. Both of the above-described production methods has been publicly known. Moreover, J. Jpn.

Soc. Powder Metallurgy Vol. 61 Supplement, No. 51, pp. S280-5284 and J. Mater. Chem. C, 2013, 1, pp. 5200-5206 can be referred to about a method for producing ε-iron oxide powder where some of Fe are substituted with substitutional atoms such as Ga, Co, Ti, Al, and Rh, for example. The method for producing ε-iron oxide powder which can be used as ferromagnetic powder in a magnetic layer of the magnetic tape, however, is not limited to these methods.

The activation volume of the ε-iron oxide powder is preferably 300 to 1,500 $nm^3$. The atomized ε-iron oxide powder showing the activation volume in the range described above is suitable for manufacturing a magnetic tape exhibiting excellent electromagnetic conversion characteristics. The activation volume of the ε-iron oxide powder is preferably equal to or greater than 300 $nm^3$ and can also be, for example equal to or greater than 500 $nm^3$. In addition, from a viewpoint of further improving electromagnetic conversion characteristics, the activation volume of the ε-iron oxide powder is more preferably equal to or smaller than 1,400 $nm^3$, even more preferably equal to or smaller than 1,300 $nm^3$, still preferably equal to or smaller than 1,200 $nm^3$, and still more preferably equal to or smaller than 1,100 $nm^3$.

The anisotropy constant Ku can be used as an index of reduction of thermal fluctuation, that is, improvement of thermal stability. The ε-iron oxide powder can preferably have Ku equal to or greater than $3.0 \times 10^4$ $J/m^3$, and more preferably have Ku equal to or greater than $8.0 \times 10^4$ $J/m^3$. In addition, Ku of the ε-iron oxide powder can be, for example, equal to or smaller than $3.0 \times 10^5$ $J/m^3$. However, the high Ku is preferable, because it means high thermal stability, and thus, Ku is not limited to the exemplified value.

From a viewpoint of increasing reproducing output in a case of reproducing data recorded on a magnetic recording medium, it is desirable that the mass magnetization as of ferromagnetic powder included in the magnetic recording medium is high. In regards to this point, in one aspect, σs of the ε-iron oxide powder can be equal to or greater than 8 $A \cdot m^2/kg$ and can also be equal to or greater than 12 $A \cdot m^2/kg$. On the other hand, from a viewpoint of noise reduction, σs of the ε-iron oxide powder is preferably equal to or smaller than 40 $A \cdot m^2/kg$ and more preferably equal to or smaller than 35 $A \cdot m^2/kg$.

In the invention and the specification, average particle sizes of various powder such as the ferromagnetic powder and the like are values measured by the following method with a transmission electron microscope, unless otherwise noted.

The powder is imaged at an imaging magnification ratio of 100,000 with a transmission electron microscope, the image is printed on photographic printing paper so that the total magnification ratio of 500,000 to obtain an image of particles configuring the powder. A target particle is selected from the obtained image of particles, an outline of the particle is traced with a digitizer, and a size of the particle (primary particle) is measured. The primary particle is an independent particle which is not aggregated.

The measurement described above is performed regarding 500 particles randomly extracted. An arithmetical mean of the particle size of 500 particles obtained as described above is an average particle size of the powder. As the transmission electron microscope, a transmission electron microscope H-9000 manufactured by Hitachi, Ltd. can be used, for example. In addition, the measurement of the particle size can be performed by well-known image analysis software, for example, image analysis software KS-400 manufactured by Carl Zeiss. The average particle size shown in examples which will be described later is a value measured by using transmission electron microscope H-9000 manufactured by Hitachi, Ltd. as the transmission electron microscope, and image analysis software KS-400 manufactured by Carl Zeiss as the image analysis software, unless otherwise noted. In the invention and the specification, the powder means an aggregate of a plurality of particles. For example, the ferromagnetic powder means an aggregate of a plurality of ferromagnetic particles. The aggregate of a plurality of particles is not limited to an aspect in which particles configuring the aggregate directly come into contact with each other, but also includes an aspect in which a binding agent, an additive, or the like which will be described later is interposed between the particles. A term, particles may be used for representing the powder.

As a method of collecting a sample powder from the magnetic tape in order to measure the particle size, a method disclosed in a paragraph 0015 of JP2011-048878A can be used, for example.

In the invention and the specification, unless otherwise noted, (1) in a case where the shape of the particle observed in the particle image described above is a needle shape, a fusiform shape, or a columnar shape (here, a height is greater than a maximum long diameter of a bottom surface), the size (particle size) of the particles configuring the powder is shown as a length of a long axis configuring the particle, that is, a long axis length, (2) in a case where the shape of the particle is a planar shape or a columnar shape (here, a thickness or a height is smaller than a maximum long diameter of a plate surface or a bottom surface), the particle size is shown as a maximum long diameter of the plate surface or the bottom surface, and (3) in a case where the shape of the particle is a sphere shape, a polyhedron shape, or an unspecified shape, and the long axis configuring the particles cannot be specified from the shape, the particle size is shown as an equivalent circle diameter. The equivalent circle diameter is a value obtained by a circle projection method.

In addition, regarding an average acicular ratio of the powder, a length of a short axis, that is, a short axis length of the particles is measured in the measurement described above, a value of (long axis length/short axis length) of each particle is obtained, and an arithmetical mean of the values obtained regarding 500 particles is calculated. Here, unless otherwise noted, in a case of (1), the short axis length as the definition of the particle size is a length of a short axis configuring the particle, in a case of (2), the short axis length is a thickness or a height, and in a case of (3), the long axis and the short axis are not distinguished, thus, the value of (long axis length/short axis length) is assumed as 1, for convenience.

In addition, unless otherwise noted, in a case where the shape of the particle is specified, for example, in a case of definition of the particle size (1), the average particle size is an average long axis length, in a case of the definition (2), the average particle size is an average plate diameter. In a case of the definition (3), the average particle size is an average diameter (also referred to as an average particle diameter).

The content (filling percentage) of the ferromagnetic powder of the magnetic layer is preferably 50% to 90% by mass and more preferably 60% to 90% by mass. The components other than the ferromagnetic powder of the magnetic layer are at least a binding agent, and one or more kinds of additives may be randomly included. A high filling percentage of the ferromagnetic powder in the magnetic layer is preferable from a viewpoint of improvement of recording density.

Binding Agent and Curing Agent

The magnetic tape is a coating type magnetic tape and includes a binding agent in the magnetic layer. The binding agent is one or more kinds of resin. As the binding agent, various resins generally used as the binding agent of the coating type magnetic recording medium can be used. For example, as the binding agent, a resin selected from a polyurethane resin, a polyester resin, a polyamide resin, a vinyl chloride resin, an acrylic resin obtained by copolymerizing styrene, acrylonitrile, or methyl methacrylate, a cellulose resin such as nitrocellulose, an epoxy resin, a phenoxy resin, and a polyvinylalkylal resin such as polyvinyl acetal or polyvinyl butyral can be used alone or a plurality of resins can be mixed with each other to be used. Among these, a polyurethane resin, an acrylic resin, a cellulose resin, and a vinyl chloride resin are preferable. The resin may be a homopolymer or a copolymer. These resins can be used as the binding agent even in the back coating layer and/or a non-magnetic layer which will be described later.

For the binding agent described above, description disclosed in paragraphs 0028 to 0031 of JP2010-024113A can be referred to. An average molecular weight of the resin used as the binding agent can be, for example, 10,000 to 200,000 as a weight-average molecular weight. The weight-average molecular weight of the invention and the specification is a value obtained by performing polystyrene conversion of a value measured by gel permeation chromatography (GPC) under the following measurement conditions. The weight-average molecular weight of the binding agent shown in examples which will be described later is a value obtained by performing polystyrene conversion of a value measured under the following measurement conditions.

GPC device: HLC-8120 (manufactured by Tosoh Corporation)

Column: TSK gel Multipore HXL-M (manufactured by Tosoh Corporation, 7.8 mmID (inner diameter)×30.0 cm)

Eluent: Tetrahydrofuran (THF)

In one aspect, as the binding agent, a binding agent including an active hydrogen-containing group can be used. The "active hydrogen-containing group" in the invention and the specification is a functional group capable of forming a crosslinked structure by a curing reaction of this group with a curable functional group and desorption of hydrogen atoms included in this group. Examples of the active hydrogen-containing group include a hydroxy group, an amino group (preferably a primary amino group or a secondary amino group), a mercapto group, and a carboxy group, a hydroxy group, an amino group and a mercapto group are preferable, and a hydroxy group is more preferable. A concentration of the active hydrogen-containing group in the binding agent including the active hydrogen-containing group is preferably 0.10 meq/g to 2.00 meq/g. eq indicates equivalent and is a unit not convertible into SI unit. In addition, the concentration of the active hydrogen-containing group can also be shown with a unit "mgKOH/g". In one aspect, the concentration of the active hydrogen-containing group in the resin including the active hydrogen-containing group is preferably 1 to 20 mgKOH/g.

In one aspect, as the binding agent, a binding agent including an acidic group can be used. The "acidic group" of the invention and the specification is used as a meaning including a state of a group capable of emitting $H^+$ in water or a solvent including water (aqueous solvent) to dissociate anions and salt thereof. Specific examples of the acidic group include a sulfonic acid group, a sulfuric acid group, a carboxy group, a phosphoric acid group, and salt thereof. For example, salt of sulfonic acid group ($—SO_3H$) is represented by $—SO_3M$, and M represents a group representing an atom (for example, alkali metal atom or the like) which may be cations in water or in an aqueous solvent. The same applies to aspects of salt of various groups described above. As an example of the binding agent including the acidic group, a resin including at least one kind of acidic group selected from the group consisting of a sulfonic acid group and salt thereof (for example, a polyurethane resin or a vinyl chloride resin) can be used. However, the resin included in the magnetic layer is not limited to these resins. In addition, in the binding agent including the acidic group, a content of the acidic group can be, for example, 0.03 to 0.50 meq/g. The content of various functional groups such as the acidic group included in the resin can be obtained by a well-known method in accordance with the kind of the functional group. The amount of the binding agent used in a magnetic layer forming composition can be, for example, 1.0 to 30.0 parts by mass with respect to 100.0 parts by mass of the ferromagnetic powder.

In addition, a curing agent can also be used together with the resin which can be used as the binding agent. As the curing agent, in one aspect, a thermosetting compound which is a compound in which a curing reaction (crosslinking reaction) proceeds due to heating can be used, and in another aspect, a photocurable compound in which a curing reaction (crosslinking reaction) proceeds due to light irradiation can be used. At least a part of the curing agent is included in the magnetic layer in a state of being reacted (crosslinked) with other components such as the binding agent, by proceeding the curing reaction in the magnetic layer forming step. This point is the same as regarding a layer formed by using a composition, in a case where the composition used for forming the other layer includes the curing agent. The preferred curing agent is a thermosetting compound, polyisocyanate is suitable. For details of the polyisocyanate, descriptions disclosed in paragraphs 0124 and 0125 of JP2011-216149A can be referred to, for example. The amount of the curing agent can be, for example, 0 to 80.0 parts by mass with respect to 100.0 parts by mass of the binding agent in the magnetic layer forming composition, and is preferably 50.0 to 80.0 parts by mass, from a viewpoint of improvement of hardness of the magnetic layer.

The description regarding the binding agent and the curing agent described above can also be applied to the back coating layer and/or the non-magnetic layer. In this case, the description regarding the content can be applied by replacing the ferromagnetic powder with the non-magnetic powder.

Additives

The magnetic layer includes a ferromagnetic powder and a binding agent, and may include one or more kinds of additives, if necessary. As the additives, the curing agent described above is used as an example. In addition, examples of the additive included in the magnetic layer include non-magnetic powder (for example, inorganic powder or carbon black), a lubricant, a dispersing agent, a dispersing assistant, an antibacterial agent, an antistatic agent, and an antioxidant. As the non-magnetic powder, non-magnetic powder which can function as an abrasive, non-magnetic powder (for example, non-magnetic colloid particles) which can function as a projection formation agent which forms projections suitably protruded from the surface of the magnetic layer, and the like can be used. An average particle size of colloidal silica (silica colloid particles) shown in the examples which will be described later is a value obtained by a method disclosed in a measurement method of an average particle diameter in a paragraph 0015 of JP2011-048878A. As the additives, a commercially available product can be suitably selected according to the desired properties or manufactured by a well-known method, and can be used with any amount. As an example of the additive which can be used in the magnetic layer including the abrasive, a dispersing agent disclosed in paragraphs 0012 to 0022 of JP2013-131285A can be used as a dispersing agent for improving dispersibility of the abrasive. For example, for the lubricant, a description disclosed in paragraphs 0030 to 0033, 0035, and 0036 of JP2016-126817A can be referred to. The non-magnetic layer may include the lubricant. For the lubricant which may be included in the non-magnetic layer, a description disclosed in paragraphs 0030, 0031, 0034, 0035, and 0036 of JP2016-126817A can be referred to. For the dispersing agent, a description disclosed in paragraphs 0061 and 0071 of JP2012-133837A can be referred to. In addition, for the dispersing agent, a description disclosed in paragraphs 0061 and 0071 of JP2012-133837, and paragraph 0035 of JP2017-016721A can also be referred to. For the additive of the magnetic layer, a description disclosed in paragraphs 0035 to 0077 of JP2016-051493A can also be referred to.

The dispersing agent may be included in the non-magnetic layer. For the dispersing agent which may be included in the non-magnetic layer, a description disclosed in a paragraph 0061 of JP2012-133837A can be referred to.

As various additives, a commercially available product can be suitably selected according to the desired properties or manufactured by a well-known method, and can be used with any amount.

The magnetic layer described above can be provided on the surface of the non-magnetic support directly or indirectly through the non-magnetic layer.

Non-Magnetic Layer

Next, the non-magnetic layer will be described. The magnetic tape may include a magnetic layer directly on the non-magnetic support or may include a non-magnetic layer including the non-magnetic powder and the binding agent between the non-magnetic support and the magnetic layer. The non-magnetic powder used in the non-magnetic layer may be powder of an inorganic substance or powder of an organic substance. In addition, carbon black and the like can be used. Examples of the inorganic substance include metal, metal oxide, metal carbonate, metal sulfate, metal nitride, metal carbide, and metal sulfide. These non-magnetic powder can be purchased as a commercially available product or can be manufactured by a well-known method. For details thereof, descriptions disclosed in paragraphs 0146 to 0150 of JP2011-216149A can be referred to. For carbon black capable of being used in the non-magnetic layer, a description disclosed in paragraphs 0040 and 0041 of JP2010-024113A can be referred to. The content (filling percentage) of the non-magnetic powder of the non-magnetic layer is preferably 50% to 90% by mass and more preferably 60% to 90% by mass.

In regards to other details of a binding agent or additives of the non-magnetic layer, the well-known technology regarding the non-magnetic layer can be applied. In addition, in regards to the type and the content of the binding agent, and the type and the content of the additive, for example, the well-known technology regarding the magnetic layer can be applied.

The non-magnetic layer of the invention and the specification also includes a substantially non-magnetic layer including a small amount of ferromagnetic powder as impurities or intentionally, together with the non-magnetic powder. Here, the substantially non-magnetic layer is a layer having a residual magnetic flux density equal to or smaller than 10 mT, a layer having coercivity equal to or smaller than 7.96 kA/m (100 Oe), or a layer having a residual magnetic flux density equal to or smaller than 10 mT and coercivity equal to or smaller than 7.96 kA/m (100 Oe). It is preferable that the non-magnetic layer does not have a residual magnetic flux density and coercivity.

Non-Magnetic Support

Next, the non-magnetic support will be described.

As the non-magnetic support (hereinafter, also simply referred to as a "support"), well-known components such as polyethylene terephthalate, polyethylene naphthalate, polyamide, polyamide imide, aromatic polyamide subjected to biaxial stretching are used. Among these, polyethylene terephthalate, polyethylene naphthalate, and polyamide are preferable. Corona discharge, plasma treatment, easy-bonding treatment, or heating process may be performed with respect to these supports in advance.

Back Coating Layer

The magnetic tape includes a back coating layer including a non-magnetic powder and a binding agent on a surface of the non-magnetic support opposite to the surface provided with the magnetic layer. Regarding the kind of the non-magnetic powder included in the back coating layer, the description regarding the non-magnetic powder included in the non-magnetic layer can be referred to. The non-magnetic powder included in the back coating layer can be preferably one or more kinds of non-magnetic powder selected from the group consisting of inorganic powder and carbon black. Generally, the inorganic powder tends to have excellent dispersibility in the back coating layer forming composition, compared to that of carbon black. An increase in dispersibility of the back coating layer forming composition can contribute to a decrease in the back coating layer surface roughness Ra. By adjusting the kind of the non-magnetic powder included in the back coating layer and a mixing ratio, in a case of including two or more kinds of the non-magnetic powders, it is possible to control the back coating layer surface roughness Ra. For example, as main powder of the non-magnetic powder in the back coating layer (non-magnetic powder, the largest amount of which is included based on mass, among the non-magnetic powder), the inorganic powder is preferably used. In a case where the non-magnetic powder included in the back coating layer is one or more kinds of the non-magnetic powder selected from the group consisting of the inorganic powder and carbon black, a percentage of the inorganic powder with respect to 100.0 parts by mass of a total amount of the non-magnetic powder is preferably greater than 50.0 parts by mass and equal to or smaller than 100.0 parts by mass, more preferably 60.0 parts by mass to 100.0 parts by mass, even more preferably 70.0 parts by mass to 100.0 parts by mass, and still more preferably 80.0 parts by mass to 100.0 parts by mass.

An average particle size of the non-magnetic powder can be, for example, 10 to 200 nm. An average particle size of the inorganic powder is preferably 50 to 200 nm and more preferably 80 to 150 nm. Meanwhile, an average particle size of the carbon black is preferably 10 to 50 nm and more preferably 15 to 30 nm.

In addition, the dispersibility of the non-magnetic powder in the back coating layer forming composition can be increased by using a well-known dispersing agent, reinforcing dispersion conditions, and the like.

The back coating layer can include one or more kinds of additives, in addition to the non-magnetic powder and the binding agent. As an example of the additive, a lubricant is used.

For example, as the lubricant, fatty acid, fatty acid ester, and fatty acid amide can be used, and a magnetic layer can be formed by using one or more kinds selected from the group consisting of fatty acid, fatty acid ester, and fatty acid amide.

Examples of fatty acid include lauric acid, myristic acid, palmitic acid, stearic acid, oleic acid, linoleic acid, linolenic acid, behenic acid, erucic acid, and elaidic acid, stearic acid, myristic acid, and palmitic acid are preferable, and stearic acid is more preferable. Fatty acid may be included in the magnetic layer in a state of salt such as metal salt.

As fatty acid ester, esters of lauric acid, myristic acid, palmitic acid, stearic acid, oleic acid, linoleic acid, linolenic acid, behenic acid, erucic acid, and elaidic acid can be used, for example. Specific examples thereof include butyl myristate, butyl palmitate, butyl stearate, neopentyl glycol dioleate, sorbitan monostearate, sorbitan distearate, sorbitan tristearate, oleyl oleate, isocetyl stearate, isotridecyl stearate, octyl stearate, isooctyl stearate, amyl stearate, and butoxyethyl stearate.

As fatty acid amide, amide of various fatty acid described above is used, and examples thereof include lauric acid amide, myristic acid amide, palmitic acid amide, and stearic acid amide.

A content of fatty acid in the back coating layer is, for example, 0 to 10.0 parts by mass, preferably 0.1 to 10.0 parts by mass, and more preferably 1.0 to 7.0 parts by mass with respect to 100.0 parts by mass of non-magnetic powder included in the back coating layer. A content of fatty acid ester in the back coating layer is, for example, 0.1 to 10.0 parts by mass and preferably 1.0 to 5.0 parts by mass with respect to 100.0 parts by mass of non-magnetic powder included in the back coating layer. A content of fatty acid amide in the back coating layer is, for example, 0 to 3.0 parts by mass, preferably 0 to 2.0 parts by mass, and more preferably 0 to 1.0 part by mass with respect to 100.0 parts by mass of the non-magnetic powder included in the back coating layer.

In the invention and the specification, a given component may be used alone or used in combination of two or more kinds thereof, unless otherwise noted. In a case where two or more kinds of given components are used, the content is a total content of the two or more kinds of components.

In regards to the binding agent included in the back coating layer and various additives which can be randomly included therein, a well-known technology regarding the back coating layer can be applied, and a well-known technology regarding the list of the magnetic layer and/or the non-magnetic layer can also be applied. For example, for the back coating layer, descriptions disclosed in paragraphs 0018 to 0020 of JP2006-331625A and page 4, line 65, to page 5, line 38, of U.S. Pat. No. 7,029,774B can be referred to.

Various Thicknesses

Regarding the thicknesses of the non-magnetic support and each layer of the magnetic tape, the thickness of the non-magnetic support is, for example, 3.0 to 80.0 μm, preferably 3.0 to 50.0 μm, and more preferably 3.0 to 10.0 μm.

A thickness of the magnetic layer can be optimized according to the amount of a saturation magnetization of a magnetic head used, a head gap length, a recording signal band, and the like, and is, for example, 10 nm to 100 nm, and is preferably 20 to 90 nm and more preferably 30 to 70 nm, from a viewpoint of realization of high-density recording. The magnetic layer may be at least one layer, or the magnetic layer can be separated to two or more layers having magnetic properties, and a configuration regarding a well-known multilayered magnetic layer can be applied. A thickness of the magnetic layer which is separated into two or more layers is a total thickness of the layers.

A thickness of the non-magnetic layer is, for example, equal to or greater than 50 nm, preferably equal to or greater than 70 nm, and more preferably equal to or greater than 100 nm. Meanwhile, the thickness of the non-magnetic layer is, for example, preferably equal to or smaller than 800 nm, and more preferably equal to or smaller than 500 nm.

A thickness of the back coating layer is preferably equal to or smaller than 0.9 μm and even more preferably 0.1 to 0.7 μm.

The thicknesses of various layers and the non-magnetic support of the magnetic tape can be obtained by a well-known film thickness measurement method. As an example, a cross section of the magnetic tape in a thickness direction is exposed by a well-known method of ion beams or microtome, and the exposed cross section is observed with a scanning electron microscope. In the cross section observation, various thicknesses can be obtained as the thickness obtained at any one portion, or as an arithmetical mean of thicknesses obtained at a plurality of portions which are two or more portions randomly extracted, for example, two portions. Alternatively, the thickness of each layer may be obtained as a designed thickness calculated under the manufacturing conditions.

Manufacturing Method

Preparation of Each Layer Forming Composition

Composition for forming the magnetic layer, the back coating layer, the non-magnetic layer generally include a solvent, together with the various components described above. As the solvent, various organic solvents generally used for manufacturing a coating type magnetic recording medium can be used. The amount of solvent in each layer forming composition is not particularly limited, and can be identical to that in each layer forming composition of a typical coating type magnetic recording medium. A step of preparing the composition for forming each layer generally includes at least a kneading step, a dispersing step, and a mixing step provided before and after these steps, if necessary. Each step may be divided into two or more stages. All of raw materials used in the invention may be added at an initial stage or in a middle stage of each step. In addition, each raw material may be separately added in two or more steps.

In order to prepare each layer forming composition, a well-known technology can be used. In the kneading step, an open kneader, a continuous kneader, a pressure kneader, or a kneader having a strong kneading force such as an extruder is preferably used. For details of the kneading processes, descriptions disclosed in JP1989-106338A (JP-H01-106338A) and JP1989-079274A (JP-H01-079274A) can be referred to. In addition, in order to disperse each layer forming composition, one or more kinds of dispersion beads selected from the group consisting of glass beads and other dispersion beads can be used as a dispersion medium. As such dispersion beads, zirconia beads, titania beads, and steel beads which are dispersion beads having high specific gravity are suitable. These dispersion beads may be used by optimizing a particle diameter (bead diameter) and a filling percentage of the dispersion beads. As a disperser, a well-known disperser can be used. Each layer forming composition may be filtered by a well-known method before performing the coating step. The filtering can be performed by using a filter, for example. As the filter used in the filtering, a filter having a hole diameter of 0.01 to 3 µm (for example, filter made of glass fiber or filter made of polypropylene) can be used, for example.

Coating Step

The magnetic layer can be formed, for example, by directly applying the magnetic layer forming composition onto the non-magnetic support or performing multilayer coating of the magnetic layer forming composition with the non-magnetic layer forming composition in order or at the same time. The back coating layer can be formed by applying the back coating layer forming composition to a side of the non-magnetic support opposite to a side provided with the magnetic layer (or to be provided with the magnetic layer). For details of the coating for forming each layer, a description disclosed in a paragraph 0051 of JP2010-024113A can be referred to.

Other Steps

After the coating step, various processes such as a drying process, an alignment process of the magnetic layer, and a surface smoothing treatment (calendar process) can be performed. For various steps, a description disclosed in paragraphs 0052 to 0057 of JP2010-024113A can be referred to.

In any stage after the coating step of the back coating layer forming composition, the heating process of a coating layer formed by applying the back coating layer forming composition is preferably performed. This heating process can be performed before and/or after the calendar process, for example. The heating process can be, for example, performed by placing a support, on which the coating layer formed by applying the back coating layer forming composition is formed, under heated atmosphere. The heated atmosphere can be an atmosphere at an atmosphere temperature of 65° C. to 90° C., and more preferably an atmosphere at an atmosphere temperature of 65° C. to 75° C. This atmosphere can be, for example, the atmosphere. The heating process under the heated atmosphere can be, for example, performed for 20 to 50 hours. In one aspect, by performing this heating process, the curing reaction of the curable functional group of the curing agent can proceed.

One Aspect of Preferable Manufacturing Method

As a preferred manufacturing method of the magnetic tape, a manufacturing method including wiping out the surface of the back coating layer with a wiping material permeated with methyl ethyl ketone (hereinafter, also referred to as a "methyl ethyl ketone wiping treatment"), preferably after the heating process can be used. It is thought that the presence of the component capable of being removed by this methyl ethyl ketone wiping treatment, on the surface of the back coating layer, promotes the attachment of moisture to the surface of the back coating layer, in a case where a temperature change from a low temperature to a high temperature occurs under high humidity. The methyl ethyl ketone wiping treatment can be performed by using a wiping material permeated with methyl ethyl ketone, instead of a wiping material used in a dry wiping treatment, based on a dry wiping treatment generally performed in the manufacturing step of the magnetic recording medium. For example, the methyl ethyl ketone wiping treatment can be performed on the surface of the back coating layer, by causing the magnetic tape to run between a sending roller and a winding roller, after or before slitting the magnetic tape to have a width accommodated in a magnetic tape cartridge, and pressing a wiping material (for example, cloth (for example, non-woven fabric) or paper (for example, tissue paper) permeated with methyl ethyl ketone to the surface of the back coating layer of the magnetic tape during running. A running speed of the magnetic tape during the running and a tension applied in a longitudinal direction of the surface of the back coating layer (hereinafter, simply referred to as a "tension") can be identical to treatment conditions generally used in the dry wiping treatment generally performed in the manufacturing step of the magnetic recording medium. For example, a running speed of the magnetic tape in the methyl ethyl ketone wiping treatment can be approximately 60 to 600 m/min, and the tension can be approximately 0.196 to 3.920 N (newton). In addition, the methyl ethyl ketone wiping treatment can be performed at least once. As described above, as the spacing difference ($S_{after}-S_{before}$) before and after the methyl ethyl ketone cleaning becomes 0 nm, in a case where the surface treatment of the back coating layer is performed, it is difficult to prevent a deterioration in running stability due to a temperature change from a low temperature to a high temperature under high humidity, in the magnetic tape having a high smoothness of the surface of the back coating layer. Therefore, by considering this point, it is preferable to set the treatment conditions of the methyl ethyl ketone wiping treatment and the number of times of the treatment.

The polishing treatment and/or the dry wiping treatment generally performed in the manufacturing step of the coating type magnetic recording medium (hereinafter, these are referred to as a "dry surface treatment") can also be performed one or more times on the surface of the back coating layer, before and/or after the methyl ethyl ketone wiping treatment. According to the dry surface treatment, for example, foreign materials which are generated during the manufacturing step such as scraps generate due to slitting, and attached to the surface of the back coating layer can be removed, for example.

The magnetic tape can be accommodated in a magnetic tape cartridge and wound around a reel rotatably included in the magnetic tape cartridge. The magnetic tape cartridge accommodating the magnetic tape is set in a magnetic recording and reproducing device, and the recording of a signal on the magnetic tape and/or the reproducing (reading) of the recorded signal can be performed by causing the magnetic tape to run in the magnetic recording and reproducing device. In the magnetic tape, in a case of reproducing the recorded signal, the reproducing can be performed with low drop-out, and it is possible to prevent a deterioration in running stability due to a temperature change from a low temperature to a high temperature under high humidity. The magnetic tape is suitable as a magnetic tape used in a sliding type magnetic recording and reproducing device. The sliding type device is a device in which the surface of the magnetic layer and the head are in contact with each other and slide, in a case of performing recording of information on the magnetic tape and/or reproducing of the recorded information.

In the magnetic tape thus prepared, a servo pattern may be formed by a known method, in order to allow control of tracking of a magnetic head and control of the running speed of the magnetic tape to be performed in the magnetic recording and reproducing device. The "formation of a servo pattern" can also be referred to as "recording of a servo signal". Formation of the servo pattern in a magnetic tape will be described below, as an example.

The servo pattern is generally recorded along the longitudinal direction of the magnetic tape. Examples of control (servo control) systems utilizing servo signals include timing-based servo (TBS), amplitude servo, and frequency servo.

As shown in European Computer Manufacturers Association (ECMA)-319, a timing-based servo technique has been employed in a magnetic tape (generally referred to as "LTO tape") in accordance with Linear Tape-Open (LTO) specifications. In this timing-based servo technique, the servo patterns are configured of consecutive alignment of a plurality of pairs of magnetic stripes (also referred to as "servo stripes"), in each pair of which magnetic stripes are not parallel with each other, in the longitudinal direction of the magnetic tape. The reason why the servo signal is configured of pairs of magnetic stripes, in each pair of which magnetic stripes are not parallel with each other, is to teach a passing position to a servo signal reading element passing over the servo pattern. Specifically, the pairs of magnetic stripes are formed so that the intervals consecutively change along the width direction of the magnetic tape, and relative positions of the servo pattern and the servo signal reading element can be determined by reading the intervals with the servo signal reading element. The information on this relative positions enable the data track to be tracked. Thus, a plurality of servo tracks are generally set over the servo signal along the width direction of the magnetic tape.

The servo band is configured of servo signals continuously aligned in the longitudinal direction of the magnetic tape. A plurality of the servo bands are generally provided in the magnetic tape. For example, in an LTO tape, the number of servo bands is five. A region sandwiched between the adjacent two servo bands is referred to as a data band. The data band is configured of a plurality of data tracks, and data tracks corresponds to respective servo tracks.

In one aspect, information on the number of servo bands (also referred to as information on a "servo band identification (ID)" or a "unique data band identification method (UDIM)") is embedded in each servo band as shown in Japanese Patent Application Publication No. 2004-318983. This servo band ID is recorded shiftedly such that the position of a specific pair of servo stripes, among a plurality of servo stripes present in a servo band, should shift in the longitudinal direction of the magnetic tape. Specifically, the degree of shifting the specific pair of servo stripes among the plurality of pairs of servo stripes is changed by each servo band. Accordingly, the recorded servo band ID is unique by each servo band, and the servo band is uniquely specified by reading one servo band with the servo signal reading element.

As another method for uniquely specifying a servo band, a method using a staggered technique as shown in ECMA-319 can be applied. In this staggered technique, a group of a plurality of pairs of magnetic stripes (servo stripes), in each pair of which magnetic stripes are not parallel with each other and which are placed consecutively in the longitudinal direction of the magnetic tape, are shiftedly recorded by each servo band in the longitudinal direction of the magnetic tape. A combination of ways of shifting for each adjacent servo bands is unique in the entire magnetic tape. Accordingly, when a servo pattern is read with two servo signal reading elements, the servo band can be uniquely specified.

Information indicating a position in the longitudinal direction of the magnetic tape (also referred to as "longitudinal position (LPOS) information") is also generally embedded in each servo band as shown in ECMA-319. This LPOS information is also recorded by shifting the position of the pair of servo stripes in the longitudinal direction of the magnetic tape. Unlike the UDIM information, the same signal is recorded in each servo band in the case of LPOS information.

Other information different from UDIM information and LPOS information as mentioned above can also be embedded in the servo band. In this case, the information to be embedded may be different by each servo band like the UDIM information or may be the same by each servo band like the LPOS information.

As a method for embedding information in a servo band, a method other than the above-described method may also be employed. For example, among a group of pairs of servo stripes, a predetermined pair of servo stripes is thinned out to record a predetermined code.

A head for forming a servo pattern is referred to as a servo write head. The servo write head has the same number of pairs of gaps corresponding to the respective pairs of magnetic stripes as the number of servo bands. Generally, a core and a coil are connected to each pair of gaps, and a magnetic field generated in the core by suppling a current pulse to the coil can generate a leakage magnetic field to the pair of gaps. When a servo pattern is formed, a magnetic pattern corresponding to a pair of gaps can be transferred to the magnetic tape by inputting a current pulse while causing a magnetic tape to run over the servo write head, to form a servo pattern. Thus, the servo pattern can be formed. The width of each gap can be set as appropriate according to the density of the servo pattern to be formed. The width of each gap can be set to, for example, 1 μm or less, 1 to 10 or 10 μm or larger.

Before forming a servo pattern on the magnetic tape, the magnetic tape is generally subjected to a demagnetization (erasing) treatment. This erasing treatment may be performed by adding a uniform magnetic field to the magnetic tape using a direct current magnet or an alternate current magnet. The erasing treatment includes direct current (DC) erasing and an alternating current (AC) erasing. The AC erasing is performed by gradually reducing the intensity of the magnetic field while inverting the direction of the magnetic field applied to the magnetic tape. In contrast, the DC erasing is performed by adding a one-direction magnetic field to the magnetic tape. The DC erasing further includes two methods. The first method is horizontal DC erasing of applying a one-direction magnetic field along the longitudinal direction of the magnetic field. The second method is a vertical DC erasing of applying a one-direction magnetic field along the thickness direction of the magnetic tape. The erasing treatment may be applied to the entire magnetic tape of the magnetic tape, or may be applied to each servo band of the magnetic tape.

The direction of the magnetic field of the servo pattern to be formed is determined according to the direction of the erasing. For example, when the magnetic tape has been subjected to the horizontal DC erasing, the servo pattern is formed so that the direction of the magnetic field becomes reverse to the direction of the erasing. Accordingly, the output of the servo signal, which can be yielded by reading the servo pattern, can be increased. As shown in Japanese Patent Application Publication No. 2012-53940, when a magnetic pattern is transferred to the magnetic tape which has been subjected to the vertical DC erasing using the gaps, the servo signal, which has been yielded by reading the servo pattern thus formed, has a unipolar pulse shape. In contrast, when a magnetic pattern is transferred to the magnetic tape which has been subjected to the parallel DC erasing, the servo signal, which has been yielded by reading the servo pattern thus formed, has a bipolar pulse shape.

Magnetic Recording and Reproducing Device

One aspect of the invention relates to a magnetic recording and reproducing device including the magnetic tape and a magnetic head.

In the invention and the specification, the "magnetic recording and reproducing device" means a device capable of performing at least one of the recording of information on the magnetic tape or the reproducing of information recorded on the magnetic tape. Such a device is generally called a drive. The magnetic recording and reproducing device can be a sliding type magnetic recording and reproducing device. The magnetic head included in the magnetic recording and reproducing device can be a recording head capable of performing the recording of information on the magnetic tape, and can also be a reproducing head capable of performing the reproducing of information recorded on the magnetic tape. In addition, in the aspect, the magnetic recording and reproducing device can include both of a recording head and a reproducing head as separate magnetic heads. In another aspect, the magnetic head included in the magnetic recording and reproducing device can also have a configuration of comprising both of a recording element and a reproducing element in one magnetic head. As the reproducing head, a magnetic head (MR head) including a magnetoresistive (MR) element capable of reading information recorded on the magnetic tape with excellent sensitivity as the reproducing element is preferable. As the MR head, various well-known MR heads can be used. In addition, the magnetic head which performs the recording of information and/or the reproducing of information may include a servo pattern reading element. Alternatively, as a head other than the magnetic head which performs the recording of information and/or the reproducing of information, a magnetic head (servo head) comprising a servo pattern reading element may be included in the magnetic recording and reproducing device.

In the magnetic recording and reproducing device, the recording of information on the magnetic tape and the reproducing of information recorded on the magnetic tape can be performed by bringing the surface of the magnetic layer of the magnetic tape into contact with the magnetic head and sliding. The magnetic recording and reproducing device may include the magnetic tape according to the aspect of the invention, and well-known technologies can be applied for the other configurations.

EXAMPLES

Hereinafter, the invention will be described with reference to examples. However, the invention is not limited to aspects shown in the examples. "Parts" and "%" in the following description mean "parts by mass" and "% by mass", unless otherwise noted. In addition, steps and evaluations described below are performed in an environment of an atmosphere temperature of 23° C.±1° C., unless otherwise noted.

Example 1

A list of each layer forming composition is shown below.
List of Magnetic Layer Forming Composition
Magnetic Liquid
Ferromagnetic powder (see Table 1): 100.0 parts
Oleic acid: 2.0 parts
Vinyl chloride copolymer (MR-104 manufactured by Kaneka Corporation): 10.0 parts $SO_3Na$ group-containing polyurethane resin: 4.0 parts
(Weight-average molecular weight: 70,000, $SO_3Na$ group: 0.07 meq/g)
Polyalkyleneimine-based polymer (synthesis product obtained by method disclosed in paragraphs 0115 to 0123 of JP2016-051493A): 6.0 parts
Methyl ethyl ketone: 150.0 parts
Cyclohexanone: 150.0 parts
Abrasive Solution
α-alumina (Brunauer-Emmett-Teller (BET) specific surface area: 19 $m^2/g$): 6.0 parts
$SO_3Na$ group-containing polyurethane resin: 0.6 parts
(Weight-average molecular weight: 70,000, $SO_3Na$ group: 0.1 meq/g)
2,3-Dihydroxynaphthalene: 0.6 parts
Cyclohexanone: 23.0 parts
Projection Formation Agent Liquid
Colloidal silica (average particle size: 120 nm): 2.0 parts
Methyl ethyl ketone: 8.0 parts
Other components
Stearic acid: 3.0 parts
Stearic acid amide: 0.3 parts
Butyl stearate: 6.0 parts
Methyl ethyl ketone: 110.0 parts
Cyclohexanone: 110.0 parts
Polyisocyanate (CORONATE (registered trademark) L manufactured by Tosoh Corporation): 3 parts
List of Non-Magnetic Layer Forming Composition
Non-magnetic inorganic powder: α-iron oxide (average particle size: 10 nm, BET specific surface area: 75 $m^2/g$): 100.0 parts
Carbon black (average particle size: 20 nm): 25.0 parts
$SO_3Na$ group-containing polyurethane resin (weight-average molecular weight: 70,000, content of $SO_3Na$ group: 0.2 meq/g): 18.0 parts
Stearic acid: 1.0 part
Cyclohexanone: 300.0 parts
Methyl ethyl ketone: 300.0 parts
List of Back Coating Layer Forming Composition
Non-magnetic powder: 100.0 parts
α-iron oxide: see Table 1 as mixing ratio (mass ratio) average particle size (average long axis length): 150 nm
average acicular ratio: 7
BET specific surface area: 52 $m^2/g$
Carbon black: see Table 1 as mixing ratio (mass ratio)
Average particle size: 20 nm
A vinyl chloride copolymer (MR-104 manufactured by Kaneka Corporation): 13.0 parts
(Weight-average molecular weight: 55,000, active hydrogen-containing group (hydroxy group): 0.33 meq/g, $OSO_3K$ group (potassium salt of sulfate group): 0.09 meq/g)
$SO_3Na$ group-containing polyurethane resin: 6.0 parts
(Weight-average molecular weight: 70,000, active hydrogen-containing group (hydroxy group): 4 to 6 mgKOH/g, $SO_3Na$ group (sodium salt of sulfonic acid group): 0.07 meq/g)
Phenylphosphonic acid: 3.0 parts
Cyclohexanone: 155.0 parts
Methyl ethyl ketone: 155.0 parts
Stearic acid: 3.0 parts
Butyl stearate: 3.0 parts
Polyisocyanate: 5.0 parts
Cyclohexanone: 200.0 parts
Preparation of Magnetic Layer Forming Composition
The magnetic layer forming composition was prepared by the following method.
A magnetic liquid was prepared by dispersing (beads-dispersing) various components of the magnetic liquid with a batch type vertical sand mill for 24 hours. As dispersion beads, zirconia beads having a bead diameter of 0.5 mm were used.

Regarding the abrasive solution, various components of the abrasive solution were mixed with each other and put in a transverse beads mill disperser together with zirconia beads having a bead diameter of 0.3 mm, so as to perform the adjustment so that a value of bead volume/(abrasive solution volume+bead volume) was 80%, the beads mill dispersion process was performed for 120 minutes, the liquid after the process was extracted, and an ultrasonic dispersion filtering process was performed by using a flow type ultrasonic dispersion filtering device. By doing so, the abrasive solution was prepared.

The prepared magnetic liquid, the abrasive solution, the projection formation agent liquid, and the other components were introduced in a dissolver stirrer, and stirred at a circumferential speed of 10 m/sec for 30 minutes. Then, a process at a flow rate of 7.5 kg/min was performed for 3 passes with a flow type ultrasonic disperser, and then, the mixture was filtered with a filter having a hole diameter of 1 μm, to prepare a magnetic layer forming composition.

Preparation of Non-Magnetic Layer Forming Composition

A non-magnetic layer forming composition was prepared by dispersing various components of the non-magnetic layer forming composition described above with a batch type vertical sand mill by using zirconia beads having a bead diameter of 0.1 mm for 24 hours, and then performing filtering with a filter having an average hole diameter of 0.5 μm.

Preparation of Back Coating Layer Forming Composition

Components except a lubricant (stearic acid and butyl stearate), polyisocyanate, and 200.0 parts of cyclohexanone among various components of the back coating layer forming composition were kneaded and diluted by an open kneader, and subjected to a dispersion process of 12 passes, with a transverse beads mill disperser and zirconia beads having a bead diameter of 1 mm, by setting a bead filling percentage as 80 volume %, a circumferential speed of rotor distal end as 10 m/sec, and a retention time for 1 pass as 2 minutes. After that, the remaining components were added and stirred with a dissolver, the obtained dispersion liquid was filtered with a filter having an average hole diameter of 1 μm and a back coating layer forming composition was prepared.

Manufacturing of Magnetic Tape

The non-magnetic layer forming composition prepared as described above was applied onto a surface of a polyethylene naphthalate support having a thickness of 5.0 μm, so that the thickness after the drying becomes 1,400 nm, and dried to form a non-magnetic layer. Then, the magnetic layer forming composition prepared as described above was applied onto a surface of the non-magnetic layer so that the thickness after the drying becomes 70 nm, to form a coating layer. A homeotropic alignment process of applying a magnetic field having strength of 0.3 T to the surface of the coating layer in a vertical direction while the coating layer of the magnetic layer forming composition is wet (not dried), and the coating layer was dried. After that, the back coating layer forming composition prepared as described above was applied on the opposite surface of the support so that the thickness after drying becomes 0.4 μm, and dried. By doing so, a magnetic tape original roll was manufactured.

The calendar process (surface smoothing treatment) was performed on the manufactured magnetic tape original roll with a calendar configured of only a metal roll, at a speed of 100 m/min, linear pressure of 300 kg/cm (294 kN/m), and a surface temperature of a calendar roll of 100° C., and heating process was performed in the environment of the atmosphere temperature shown in Table 1 for a period of time shown in Table 1. After the heating process, a magnetic tape having a width of ½ inches (0.0127 meters) was obtained by slitting the magnetic tape original roll with a cutter. While causing this magnetic tape to run between a sending roller and a winding roller (running speed: 120 m/min, tension: see Table 1), blade polishing of the surface of the back coating layer, the dry wiping treatment, and the methyl ethyl ketone wiping treatment were performed in this order. Specifically, a sapphire blade, a dried wiping material (TORAYSEE (registered trademark) manufactured by Toray Industries, Inc.), and a wiping material permeated with methyl ethyl ketone (TORAYSEE (registered trademark) manufactured by Toray Industries, Inc.) were disposed between the two rollers described above, the sapphire blade was pressed against the surface of the back coating layer of the magnetic tape running between the two rollers for blade polishing, the dry wiping treatment of the surface of the back coating layer was performed with the dried wiping material, and the methyl ethyl ketone wiping treatment of the surface of the back coating layer was performed with the wiping material permeated with methyl ethyl ketone. By doing so, the blade polishing, the dry wiping treatment, and the methyl ethyl ketone wiping treatment were performed on the surface of the back coating layer once.

In a state where the magnetic layer of the manufactured magnetic tape was demagnetized, servo patterns having disposition and shapes according to the linear-tape-open (LTO) Ultrium format were formed on the magnetic layer by using a servo write head mounted on a servo writer. Accordingly, a magnetic tape including data bands, servo bands, and guide bands in the disposition according to the LTO Ultrium format in the magnetic layer, and including servo patterns having the disposition and the shape according to the LTO Ultrium format on the servo band was obtained.

By doing so, a magnetic tape of Example 1 was obtained.

Examples 2 to 9 and Comparative Examples 1 to 5

Magnetic tapes were manufactured by the same method as in Example 1, except that various conditions were changed as shown in Table 1.

Regarding the surface treatment of the surface of the back coating layer after the slitting, in Examples 2 to 4, 7 to 9 and Comparative Example 4, the blade polishing, the dry wiping treatment, and the methyl ethyl ketone wiping treatment were performed in the same manner as in Example 1.

In Examples 5 and 6 and Comparative Example 5, the blade polishing, the dry wiping treatment, and the methyl ethyl ketone wiping treatment were performed in the same manner as in Example 1, except that the tension was changed.

In Comparative Examples 1 and 3, the blade polishing and the dry wiping treatment were repeatedly performed in the same manner as in Example 1, and the methyl ethyl ketone wiping treatment was not performed.

In Comparative Example 2, the blade polishing and the dry wiping treatment were performed in the same manner as in Example 1 three times, and methyl ethyl ketone wiping treatment was not performed.

In Table 1, "BaFe" is hexagonal barium ferrite powder having an average particle size (average plate diameter) of 21 nm.

In Table 1, "SrFe1" is the hexagonal strontium ferrite powder prepared by the following method.

1,707 g of $SrCO_3$, 687 g of $H_3BO_3$, 1,120 g of $Fe_2O_3$, 45 g of $Al(OH)_3$, 24 g of $BaCO_3$, 13 g of $CaCO_3$, and 235 g of $Nd_2O_3$ were weighed and mixed with a mixer to obtain a raw material mixture.

The obtained raw material mixture was melted in a platinum crucible at a melting temperature of 1,390° C., a tap hole provided on the bottom of the platinum crucible was heated while stirring the melted liquid, and the melted liquid was extracted in a rod shape at approximately 6 g/sec. The extracted liquid was rolled and rapidly cooled with a water-cooled twin roller to manufacture an amorphous material.

280 g of the manufactured amorphous material was put into an electric furnace and heated to 635° C. (crystallization temperature) at a rate of temperature increase of 3.5° C./min, and held at the same temperature for 5 hours, to precipitate (crystallize) hexagonal strontium ferrite particles.

Then, a crystalline material obtained above including the hexagonal strontium ferrite particles was coarsely crushed with a mortar and subjected to a dispersion process with a paint shaker for 3 hours, by adding 1,000 g of zirconia beads having a particle diameter of 1 mm and 800 ml of acetic acid having a concentration of 1% in a glass bottle. After that, the obtained dispersion liquid was separated from the beads and put into a stainless steel beaker. A dissolving process of the glass component was performed by leaving the dispersion liquid at a liquid temperature of 100° C. for 3 hours, the precipitation was performed with a centrifugal separator, decantation was repeated for washing, and the resultant material was dried in a heating furnace at a temperature in the furnace of 110° C. for 6 hours, thereby obtaining hexagonal strontium ferrite powder.

The hexagonal strontium ferrite powder obtained above had an average particle size of 18 nm, an activation volume of 902 $nm^3$, an anisotropy constant of $2.2 \times 10^5$ $J/m^3$, and a mass magnetization σs of 49 $A \cdot m^2/kg$.

12 mg of sample powder was collected from the hexagonal strontium ferrite powder obtained above, element analysis of filtrate obtained by partially dissolving the sample powder under the dissolving conditions exemplified above was performed by the ICP analysis device, and the surface portion content of neodymium atom was obtained.

Separately, 12 mg of sample powder was collected from the hexagonal strontium ferrite powder obtained above, element analysis of filtrate obtained by totally dissolving the sample powder under the dissolving conditions exemplified above was performed by the ICP analysis device, and the surface portion content of neodymium atom was obtained.

In the hexagonal strontium ferrite powder, the content (bulk content) of neodymium atom with respect to 100 atom % of iron atom was 2.9 atom %, and the surface portion content of neodymium atom was 8.0 atom %. The "surface portion content/bulk content", that is a ratio of the surface portion content to the bulk content, was 2.8. It was confirmed that the neodymium atom was unevenly distributed in the surface portion of the particles.

The X-ray diffraction analysis of the powder obtained above was performed by scanning with a CuKα ray at a voltage of 45 kV and intensity of 40 mA and by measuring X-ray diffraction pattern under the conditions. By the X-ray diffraction analysis, it was confirmed that the powder obtained above showed the crystal structure of hexagonal ferrite. The powder obtained above showed a crystal structure of magnetoplumbite type (M type) hexagonal ferrite. In addition, a crystal phase detected by the X-ray diffraction analysis was a magnetoplumbite type single phase.

PANalytical X'Pert Pro diffractometer, PIXcel detector
Soller slit of incident beam and diffraction beam: 0.017 radians
Fixed angle of dispersion slit: ¼ degrees
Mask: 10 mm
Scattering prevention slit: ¼ degrees
Measurement mode: continuous
Measurement time per 1 stage: 3 seconds
Measurement speed: 0.017 degrees per second
Measurement step: 0.05 degrees In Table 1, "SrFe2" is the hexagonal strontium ferrite powder prepared by the following method.

At first, 1,725 g of $SrCO_3$, 666 g of $H_3BO_3$, 1,332 g of $Fe_2O_3$, 52 g of $Al(OH)_3$, 34 g of $CaCO_3$, and 141 g of $BaCO_3$ were weighed, and were then mixed with a mixer to obtain a raw material mixture.

The obtained raw material mixture was dissolved in a platinum crucible at a melting temperature of 1380° C., a tap hole provided on the bottom of the platinum crucible was heated while stirring the melted liquid, and the melted liquid was extracted in a rod shape at approximately 6 g/sec. The extracted liquid was rolled and rapidly cooled with a water-cooled twin roller to manufacture an amorphous material.

Then, 280 g of the obtained amorphous material was placed in an electric furnace, the temperature in the electric furnace was raised to 645° C. (crystallization temperature), and the amorphous material was still stood in the electric furnace for 5 hours at the same temperature, to precipitate (crystalize) hexagonal strontium ferrite particles.

Subsequently, the above-obtained crystal containing hexagonal strontium ferrite particles was roughly ground in a mortar, and the ground crystals was put in a glass bottle, together with 1000 g of zirconia beads having a particle diameter of 1 mm and 800 ml of acetic acid having a concentration of 1% and were subjected to a dispersion treatment for 3 hours with a paint shaker. Thereafter, the obtained dispersion was separated from the beads and put in a stainless beaker. The dispersion was stood still at a liquid temperature of 100° C. for 3 hours to dissolve a glass component, and thereafter centrifuged in a centrifugal separator to precipitation and were repeatedly decanted to wash the precipitated matter and the precipitated matter is dried in a furnace at an in-furnace temperature of 110° C. for 6 hours, to obtain hexagonal strontium ferrite powder.

The obtained hexagonal strontium ferrite powder had an average particle size of 19 nm, an activation volume of 1102 $nm^3$, an anisotropy constant Ku of $2.0 \times 10^5$ $J/m^3$, and a mass magnetization as of 50 $A \cdot m^2/kg$.

In Table 1, "ε-iron oxide" is the s-iron oxide powder prepared by the following method.

A solution was prepared by dissolving 8.3 g of iron(III) nitrate nonahydrate, 1.3 g of gallium(III) nitrate octahydrate, 190 mg of cobalt(II) nitrate hexahydrate, 150 mg of titanium (IV) sulfate, and 1.5 g of polyvinylpyrrolidone (PVP) in 90 g of pure water. While stirring the solution using a magnetic stirrer, 4.0 g of aqueous ammonia solution having a concentration of 25% was then added to the solution in the atmosphere under a condition of an ambient temperature of 25° C. and stirred for subsequent 2 hours under the same ambient temperature of 25° C. A citric acid solution, which was obtained by dissolving 1 g of citric acid in 9 g of pure water, was added to the obtained solution, and the obtained mixture was then stirred for 1 hour. Powder precipitated after the stirring was collected by centrifugal separation, washed with pure water, and dried in a furnace at an in-furnace temperature of 80° C.

To the dried powder, 800 g of pure water was added to disperse the powder in water again for preparing a dispersion. The obtained dispersion was heated at a liquid temperature of 50° C., and 40 g of aqueous ammonia solution having a concentration of 25% was added dropwise thereto while stirring the dispersion. The dispersion was stirred for 1 hour while maintaining the liquid temperature at 50° C., and 14 mL of tetraethoxysilane (TEOS) was then added dropwise to the dispersion, and the obtained mixture was then stirred for 24 hours. To the obtained reaction solution, 50 g of ammonium sulfate was added, and precipitated powder was then collected by centrifugal separation, washed with pure water, and dried in a furnace at an in-furnace temperature of 80° C., to obtain a ferromagnetic powder precursor.

The obtained ferromagnetic powder precursor was put in a furnace at an in-furnace temperature of 1000° C. in the atmosphere and heat-treated for 4 hours.

The heat-treated ferromagnetic powder precursor was introduced into a 4 mol/L aqueous sodium hydroxide (NaOH) solution, and then stirred for 24 hours while maintaining a liquid temperature at 70° C. to remove impurity silicate compound from the ferromagnetic powder precursor subjected to the heat treatment.

Thereafter, the ferromagnetic powder from which a silicate compound has been removed was collected by a centrifugal separation and washed with pure water, to obtain ferromagnetic powder.

The composition of the obtained ferromagnetic powder was analyzed by inductively coupled plasma-optical emission spectrometry (ICP-OES) and was found to be Ga, Co, and Ti substitution-type ε-iron oxide ($\varepsilon$-$Ga_{0.28}Co_{0.05}Ti_{0.05}Fe_{1.62}O_3$). Moreover, the obtained ferromagnetic powder was analyzed by X-ray diffraction analysis under the same conditions as described for SrFe1 above, and it was confirmed from peaks in the X-ray diffraction pattern that the obtained ferromagnetic powder did not have crystal structures of α phase and γ phase and had a single crystal structure of s phase (ε-iron oxide type crystal structure).

The obtained ε-iron oxide powder had an average particle size of 12 nm, an activation volume of 746 $nm^3$, an anisotropy constant Ku of $1.2 \times 10^5$ $J/m^3$, and a mass magnetization σs of 16 $A \cdot m^2/kg$.

The activation volume and anisotropy constant Ku of each of the hexagonal strontium ferrite powder and the ε-iron oxide powder were values determined by the above-described method using a vibrating sample magnetometer (manufactured by Toei Industry Co., Ltd.).

Moreover, the mass magnetization σs is a value measured using a vibrating sample magnetometer (manufactured by Toei Industry Co., Ltd.) at a magnetic field strength of 15 kOe.

Evaluation of Magnetic Tape (1) Center Line Average Surface Roughness Ra Measured Regarding Surface of Back Coating Layer (Back Coating Layer Surface Roughness Ra)

The measurement regarding a measurement area of 40 μm×40 μm in the surface of the back coating layer of the magnetic tape was performed with an atomic force microscope (AFM, Nanoscope 4 manufactured by Veeco Instruments, Inc.) in a tapping mode, and a center line average surface roughness Ra was acquired. RTESP-300 manufactured by BRUKER is used as a probe, a scan speed (probe movement speed) was set as 40 μm/sec, and a resolution was set as 512 pixel×512 pixel.

(2) Spacing Difference ($S_{after}-S_{before}$) Before and after Methyl Ethyl Ketone Cleaning The spacing difference ($S_{after}-S_{before}$) before and after the methyl ethyl ketone cleaning was obtained with a Tape Spacing Analyzer (TSA) (manufactured by Micro Physics, Inc.) by the following method.

Two test pieces having a length of 5 cm were cut out from each magnetic tape of the examples and the comparative examples. Regarding one test piece, the methyl ethyl ketone cleaning was not performed and the spacing ($S_{before}$) was obtained by the following method. Regarding the other test piece, the methyl ethyl ketone cleaning was performed by the method described above, and the spacing ($S_{after}$) was obtained by the following method.

In a state where a glass plate (glass plate (model no.: WG10530) manufactured by Thorlabs, Inc.) comprised in TSA is disposed on the surface of the back coating layer of the magnetic tape (specifically, the test piece), a urethane hemisphere comprised in TSA as a pressing member was pressed against the surface of the magnetic layer of the magnetic tape with pressure of $5.05 \times 10^4$ N/m (0.5 atm). In this state, a certain region (150,000 to 200,000 $\mu m^2$) of the surface of the back coating layer of the magnetic tape was irradiated with white light from a stroboscope comprised in the TSA through the glass plate, the obtained reflected light was received with a charge-coupled device (CCD) through an interference filter (filter selectively transmitting light at a wavelength of 633 nm), thereby obtaining an interference fringe image generated on ruggedness of this region.

This image was divided into 300,000 points, a distance (spacing) between the surface of the glass plate of each point on the magnetic tape side and the surface of the back coating layer of the magnetic tape was obtained, this spacing is shown with a histogram, a mode $S_{before}$ of the histogram obtained regarding the test piece not subjected to the methyl ethyl ketone cleaning was subtracted from a mode $S_{after}$ of the histogram obtained regarding the test piece after the methyl ethyl ketone cleaning, and the difference ($S_{after}-S_{before}$) was obtained.

(3) Spacing Difference ($S_{reference}-S_{before}$) Before and After N-Hexane Cleaning (Reference Value)

One test piece having a length of 5 cm was further cut out from each magnetic tape of the examples and the comparative examples, the cleaning was performed in the same manner as described above, except that n-hexane was used instead of methyl ethyl ketone, and the spacing was obtained after n-hexane cleaning in the same manner as described above. A difference ($S_{reference}-S_{before}$) between the spacing $S_{reference}$ obtained here as a reference value, and the spacing $S_{before}$ obtained from the tape piece not subjected to the cleaning obtained in the section of (2) was obtained.

(4) Drop-Out

Regarding each magnetic tape of the examples and the comparative examples, the measurement of the drop-out was performed with a reel tester having a width of ½ inch (0.0127 meters), to which a head was fixed. The information was recorded with a recording head (metal-in-gap (MIG) head (gap length of 0.15 μm, track width of 1.0 μm, 1.8 T)) at linear recording density of 325 kfci, and was reproduced with a reproducing head (Giant Magnetoresistive (GMR) head (element thickness of 15 nm, distance between shields of 0.1 μM, track width of 1.0 μm)). The unit kfci is a unit of linear recording density (cannot be converted into the unit SI). The number of signal drop-out having a length of 0.4 μm with reduced output equal to or greater than 40% of the average output was detected, and the number per 1 m of a length of tape (per measurement area 1 $mm^2$ (=track width (1.0 μm)×tape length (1 m)) was set as the drop-out. From a viewpoint of decreasing an error rate, the drop-out is preferably equal to or smaller than 800 number/mm².

(5) Evaluation of Deterioration in Running Stability Due to Temperature Change from Low Temperature to High Temperature Under High Humidity Each magnetic tape of the examples and the comparative examples was stored in a thermo box in which a temperature was 10° C. and relative humidity was 80%, for 3 hours. After that, the magnetic tape was extracted from the thermo box (in the outside air, a temperature was 23° C. and relative humidity was 50%), and put in a thermo room in which a temperature was 32° C. and relative humidity was 80% within 1 minute, and a position error signal (PES) was obtained by the following method in the thermo room within 30 minutes.

Regarding each magnetic tape of the examples and the comparative examples, a servo pattern was read with a verifying head on a servo writer used in the formation of the servo pattern. The verifying head is a magnetic head for reading for confirming quality of the servo pattern formed in the magnetic tape, and an element for reading is disposed on a position corresponding to the position (position of the magnetic tape in a width direction) of the servo pattern, in the same manner as the magnetic tape of the well-known magnetic tape device (drive).

In the verifying head, a well-know PES arithmetic circuit which calculates head positioning accuracy of the servo system as the PES is connected from an electrical signal obtained by reading the servo pattern in the verifying head. The PES arithmetic circuit calculates, if necessary, displacement of the magnetic tape in a width direction from the input electrical signal (pulse signal), and a value obtained by applying a high pass filter (cut-off: 500 cycles/m) with respect to a temporal change information (signal) of this displacement was calculated as the PES. The PES can be an index for running stability, and in a case where the calculated PES is equal to or smaller than 18 nm, it is possible to evaluate that a deterioration in running stability due to a temperature change from a low temperature to a high temperature under high humidity is prevented.

The result described above is shown in Table 1 (Tables 1-1 and 1-2).

TABLE 1-1

|  | Example 1 | Example 2 | Example 3 | Example 4 | Example 5 | Example 6 | Example 7 | Example 8 | Example 9 |
|---|---|---|---|---|---|---|---|---|---|
| Ferromagnetic powder | BaFe | BaFe | BaFe | BaFe | BaFe | BaFe | SrFe1 | SrFe2 | ε-iron oxide |
| Mixing ratio of non-magnetic powder in back coating layer (α-iron oxide/carbon black) | 60/40 | 80/20 | 100/0 | 60/40 | 60/40 | 60/40 | 60/40 | 60/40 | 60/40 |
| Heating process Temperature ° C. | 70° C. | 70° C. | 70° C. | 80° C. | 80° C. | 80° C. | 70° C. | 70° C. | 70° C. |
| Time | 36 hours | 36 hours | 36 hours | 48 hours | 48 hours | 48 hours | 36 hours | 36 hours | 36 hours |
| Tension (N) | 0.294 | 0.294 | 0.294 | 0.294 | 0.588 | 1.176 | 0.294 | 0.294 | 0.294 |
| Blade polishing and dry wiping treatment | 1 time | 1 time | 1 time | 1 time | 1 time | 1 time | 1 time | 1 time | 1 time |
| Methyl ethyl ketone wiping treatment | Performed | Performed | Performed | Performed | Performed | Performed | Performed | Performed | Performed |
| Back coating layer surface roughness Ra | 7.0 nm | 5.0 nm | 3.0 nm | 7.0 nm | 7.0 nm | 7.0 nm | 7.0 nm | 7.0 nm | 7.0 nm |
| (Reference value) Spacing difference ($S_{reference} - S_{before}$) before and after n-hexane cleaning (nm) | 4.0 | 4.0 | 4.0 | 4.0 | 4.0 | 2.0 | 4.0 | 4.0 | 4.0 |
| Spacing difference ($S_{after} - S_{before}$) before and after methyl ethyl ketone cleaning (nm) | 28.0 | 25.0 | 26.0 | 21.0 | 11.0 | 4.0 | 28.0 | 28.0 | 28.0 |
| Drop-out | 625 number/mm² | 427 number/mm² | 189 number/mm² | 619 number/mm² | 632 number/mm² | 610 number/mm² | 625 number/mm² | 625 number/mm² | 625 number/mm² |
| Evaluation of deterioration in running stability (PES) | 12 nm | 11 nm | 15 nm | 9 nm | 7 nm | 8 nm | 12 nm | 12 nm | 12 nm |

TABLE 1-2

|  | Comparative Example 1 | Comparative Example 2 | Comparative Example 3 | Comparative Example 4 | Comparative Example 5 |
|---|---|---|---|---|---|
| Ferromagnetic powder | BaFe | BaFe | BaFe | BaFe | BaFe |
| Mixing ratio of non-magnetic powder in back coating layer (α-iron oxide/carbon black) | 60/40 | 60/40 | 60/40 | 20/80 | 60/40 |
| Heating process Temperature | 60° C. | 60° C. | 70° C. | 70° C. | 80° C. |
| Time | 24 hours | 24 hours | 36 hours | 36 hours | 48 hours |
| Tension (N) | 0.294 | 0.294 | 0.294 | 0.294 | 1.960 |
| Blade polishing and dry wiping treatment | 1 time | 3 time | 1 time | 1 time | 1 time |

TABLE 1-2-continued

| | Comparative Example 1 | Comparative Example 2 | Comparative Example 3 | Comparative Example 4 | Comparative Example 5 |
|---|---|---|---|---|---|
| Methyl ethyl ketone wiping treatment | Not performed | Not performed | Not performed | Performed | Performed |
| Back coating layer surface roughness Ra | 7.0 nm | 7.0 nm | 7.0 nm | 9.0 nm | 7.0 nm |
| (Reference value) Spacing difference ($S_{reference} - S_{before}$) before and after n-hexane cleaning (nm) | 4.0 | 4.0 | 4.0 | 4.0 | 0 |
| Spacing difference ($S_{after} - S_{before}$) before and after methyl ethyl ketone cleaning (nm) | 34.0 | 33.0 | 32.0 | 9.0 | 0 |
| Drop-out | 621 number/mm² | 630 number/mm² | 628 number/mm² | 1188 number/mm² | 623 number/mm² |
| Evaluation of deterioration in running stability (PES) | 31 nm | 22 nm | 23 nm | 13 nm | 30 nm |

As shown in Table 1, the magnetic tape of the examples includes a back coating layer having a back coating layer surface roughness Ra equal to or smaller than 7.0 nm and having a high surface smoothness. From the evaluation result of the drop-out, it is possible to confirm that the occurrence of drop-out in the magnetic tapes of the examples can be prevented. It is thought that, this is because, since the surface smoothness of the back coating layer is high, the set-off to the surface of the magnetic layer is prevented.

In addition, in the magnetic tapes of the examples, the surface smoothness of the back coating layer is high, and the spacing difference ($S_{after}-S_{before}$) before and after the methyl ethyl ketone cleaning is greater than 0 nm and equal to or smaller than 30.0, as described above. The magnetic tapes of the examples have excellent running stability, even in a case where the magnetic tape is exposed to a temperature change from a low temperature to a high temperature under high humidity, as shown in Table 1.

In addition, as shown in Table 1, there is no correlation between the value of the spacing difference ($S_{reference}-S_{before}$) before and after n-hexane cleaning and the value of the spacing difference ($S_{after}-S_{before}$) before and after methyl ethyl ketone cleaning.

One aspect of the invention is effective in a technical field of a magnetic recording medium for various data storage.

What is claimed is:

1. A magnetic tape comprising:
   a non-magnetic support;
   a magnetic layer including a ferromagnetic powder and a binding agent on one surface of the non-magnetic support; and
   a back coating layer including a non-magnetic powder and a binding agent on the other surface of the non-magnetic support,
   wherein the center line average surface roughness Ra measured regarding a surface of the back coating layer is equal to or smaller than 7.0 nm,
   the difference $S_{after}-S_{before}$ between a spacing $S_{after}$ measured by optical interferometry regarding the surface of the back coating layer after methyl ethyl ketone cleaning and a spacing $S_{before}$ measured by optical interferometry regarding the surface of the back coating layer before methyl ethyl ketone cleaning is greater than 0 nm and equal to or smaller than 30.0 nm, and
   the spacing measured by optical interferometry is measured by the following method:
   overlapping a test piece of the magnetic tape on which methyl ethyl ketone cleaning has not been performed and a transparent plate-shaped member so that the surface of the back coating layer of the tape faces the transparent plate-shaped member;
   pressing a pressing member against the side of the magnetic tape opposite to the back coating layer side at pressure of $5.05 \times 10^4$ N/m;
   in this state, irradiating the surface of the back coating layer of the magnetic tape with light through the transparent plate-shaped member;
   acquiring a spacing $S_{before}$ between the surface of the back coating layer of the magnetic tape and the surface of the transparent plate-shaped member on the magnetic tape based on intensity of interference light generated due to a difference in a light path between reflected light from the surface of the back coating layer of the magnetic tape and reflected light from the surface of the transparent plate-shaped member on the magnetic tape;
   acquiring a spacing $S_{after}$ by the same method, employing a test piece of the magnetic tape on which methyl ethyl ketone cleaning has been performed; and
   subtracting the results for the measurement of $S_{before}$ from the results for the measurement of $S_{after}$ to obtain the difference ($S_{after}-S_{before}$).

2. The magnetic tape according to claim 1, wherein the difference $S_{after}-S_{before}$ is 2.0 nm to 30.0 nm.

3. The magnetic tape according to claim 1, wherein the difference $S_{after}-S_{before}$ is 4.0 nm to 28.0 nm.

4. The magnetic tape according to claim 1, further comprising:
   a non-magnetic layer including a non-magnetic powder and a binding agent between the non-magnetic support and the magnetic layer.

5. The magnetic tape according to claim 1, wherein the center line average surface roughness Ra measured regarding the surface of the back coating layer is 3.0 nm to 7.0 nm.

6. A magnetic recording and reproducing device comprising:
- a magnetic tape; and
- a magnetic head,
- wherein the magnetic tape is a magnetic tape comprising:
- a non-magnetic support;
- a magnetic layer including a ferromagnetic powder and a binding agent on one surface of the non-magnetic support; and
- a back coating layer including a non-magnetic powder and a binding agent on the other surface of the non-magnetic support,
- wherein the center line average surface roughness Ra measured regarding a surface of the back coating layer is equal to or smaller than 7.0 nm,
- the difference $S_{after}-S_{before}$ between a spacing $S_{after}$ measured by optical interferometry regarding the surface of the back coating layer after methyl ethyl ketone cleaning and a spacing $S_{before}$ measured by optical interferometry regarding the surface of the back coating layer before methyl ethyl ketone cleaning is greater than 0 nm and equal to or smaller than 30.0 nm, and
- the spacing measured by optical interferometry is measured by the following method:
- overlapping a test piece of the magnetic tape on which methyl ethyl ketone cleaning has not been performed and a transparent plate-shaped member so that the surface of the back coating layer of the tape faces the transparent plate-shaped member;
- pressing a pressing member against the side of the magnetic tape opposite to the back coating layer side at pressure of $5.05 \times 10^4$ N/m;
- in this state, irradiating the surface of the back coating layer of the magnetic tape with light through the transparent plate-shaped member;
- acquiring a spacing $S_{before}$ between the surface of the back coating layer of the magnetic tape and the surface of the transparent plate-shaped member on the magnetic tape based on intensity of interference light generated due to a difference in a light path between reflected light from the surface of the back coating layer of the magnetic tape and reflected light from the surface of the transparent plate-shaped member on the magnetic tape;
- acquiring a spacing $S_{after}$ by the same method, employing a test piece of the magnetic tape on which methyl ethyl ketone cleaning has been performed; and
- subtracting the results for the measurement of $S_{before}$ from the results for the measurement of $S_{after}$ to obtain the difference ($S_{after}-S_{before}$).

7. The magnetic recording and reproducing device according to claim 6,
wherein the difference $S_{after}-S_{before}$ is 2.0 nm to 30.0 nm.

8. The magnetic recording and reproducing device according to claim 6,
wherein the difference $S_{after}-S_{before}$ is 4.0 nm to 28.0 nm.

9. The magnetic recording and reproducing device according to claim 6,
wherein the magnetic tape further comprises a non-magnetic layer including a non-magnetic powder and a binding agent between the non-magnetic support and the magnetic layer.

10. The magnetic recording and reproducing device according to claim 6,
wherein the center line average surface roughness Ra measured regarding the surface of the back coating layer is 3.0 nm to 7.0 nm.

11. A magnetic recording medium comprising:
- a non-magnetic support;
- a magnetic layer including a ferromagnetic powder and a binding agent on one surface of the non-magnetic support; and
- a back coating layer including a non-magnetic powder and a binding agent on the other surface of the non-magnetic support,
- wherein the center line average surface roughness Ra measured regarding a surface of the back coating layer is equal to or smaller than 7.0 nm,
- the difference $S_{after}-S_{before}$ between a spacing $S_{after}$ measured by optical interferometry regarding the surface of the back coating layer after methyl ethyl ketone cleaning and a spacing $S_{before}$ measured by optical interferometry regarding the surface of the back coating layer before methyl ethyl ketone cleaning is greater than 0 nm and equal to or smaller than 30.0 nm, and
- the spacing measured by optical interferometry is measured by the following method:
- overlapping a test piece of the magnetic tape on which methyl ethyl ketone cleaning has not been performed and a transparent plate-shaped member so that the surface of the back coating layer of the tape faces the transparent plate-shaped member;
- pressing a pressing member against the side of the magnetic tape opposite to the back coating layer side at pressure of $5.05 \times 10^4$ N/m;
- in this state, irradiating the surface of the back coating layer of the magnetic tape with light through the transparent plate-shaped member;
- acquiring a spacing $S_{before}$ between the surface of the back coating layer of the magnetic tape and the surface of the transparent plate-shaped member on the magnetic tape based on intensity of interference light generated due to a difference in a light path between reflected light from the surface of the back coating layer of the magnetic tape and reflected light from the surface of the transparent plate-shaped member on the magnetic tape;
- acquiring a spacing $S_{after}$ by the same method, employing a test piece of the magnetic tape on which methyl ethyl ketone cleaning has been performed; and
- subtracting the results for the measurement of $S_{before}$ from the results for the measurement of $S_{after}$ to obtain the difference ($S_{after}-S_{before}$).

12. The magnetic recording medium according to claim 11,
wherein the difference $S_{after}-S_{before}$ is 2.0 nm to 30.0 nm.

13. The magnetic recording medium according to claim 11,
wherein the difference $S_{after}-S_{before}$ is 4.0 nm to 28.0 nm.

14. The magnetic recording medium according to claim 11, further comprising:
a non-magnetic layer including a non-magnetic powder and a binding agent between the non-magnetic support and the magnetic layer.

15. The magnetic recording medium according to claim 11,
wherein the center line average surface roughness Ra measured regarding the surface of the back coating layer is 3.0 nm to 7.0 nm.

16. A magnetic recording and reproducing device comprising:
- a magnetic recording medium; and
- a magnetic head, wherein the magnetic recording medium is a magnetic recording medium comprising:

a non-magnetic support;

a magnetic layer including a ferromagnetic powder and a binding agent on one surface of the non-magnetic support; and a back coating layer including a non-magnetic powder and a binding agent on the other surface of the non-magnetic support, wherein the center line average surface roughness Ra measured regarding a surface of the back coating layer is equal to or smaller than 7.0 nm, and the difference $S_{after}-S_{before}$ between a spacing $S_{after}$ measured by optical interferometry regarding the surface of the back coating layer after methyl ethyl ketone cleaning and a spacing $S_{before}$ measured by optical interferometry regarding the surface of the back coating layer before methyl ethyl ketone cleaning is greater than 0 nm and equal to or smaller than 30.0 nm, and the spacing measured by optical interferometry is measured by the following method:

overlapping a test piece of the magnetic tape on which methyl ethyl ketone cleaning has not been performed and a transparent plate-shaped member so that the surface of the back coating layer of the tape faces the transparent plate-shaped member;

pressing a pressing member against the side of the magnetic tape opposite to the back coating layer side at pressure of $5.05 \times 10^4$ N/m;

in this state, irradiating the surface of the back coating layer of the magnetic tape with light through the transparent plate-shaped member;

acquiring a spacing $S_{before}$ between the surface of the back coating layer of the magnetic tape and the surface of the transparent plate-shaped member on the magnetic tape based on intensity of interference light generated due to a difference in a light path between reflected light from the surface of the back coating layer of the magnetic tape and reflected light from the surface of the transparent plate-shaped member on the magnetic tape;

acquiring a spacing $S_{after}$ by the same method, employing a test piece of the magnetic tape on which methyl ethyl ketone cleaning has been performed; and subtracting the results for the measurement of $S_{before}$ from the results for the measurement of $S_{after}$ to obtain the difference $(S_{after}-S_{before})$.

17. The magnetic recording and reproducing device according to claim 16,
wherein the difference $S_{after}-S_{before}$ is 2.0 nm to 30.0 nm.

18. The magnetic recording and reproducing device according to claim 16,
wherein the difference $S_{after}-S_{before}$ is 4.0 nm to 28.0 nm.

19. The magnetic recording and reproducing device according to claim 16,
wherein the magnetic recording medium further comprises a non-magnetic layer including a non-magnetic powder and a binding agent between the non-magnetic support and the magnetic layer.

20. The magnetic recording and reproducing device according to claim 16,
wherein the center line average surface roughness Ra measured regarding the surface of the back coating layer is 3.0 nm to 7.0 nm.

\* \* \* \* \*